United States Patent
Urano

(10) Patent No.: US 10,809,721 B2
(45) Date of Patent: Oct. 20, 2020

(54) AUTONOMOUS DRIVING SYSTEM

(71) Applicant: TOYOTA JIDOSHA KABUSHIKI KAISHA, Toyota-shi, Aichi-ken (JP)

(72) Inventor: Hiromitsu Urano, Numazu (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 197 days.

(21) Appl. No.: 15/850,419

(22) Filed: Dec. 21, 2017

(65) Prior Publication Data

US 2018/0181128 A1 Jun. 28, 2018

(30) Foreign Application Priority Data

Dec. 27, 2016 (JP) .................................. 2016-253728

(51) Int. Cl.
| | |
|---|---|
| *G05D 1/00* | (2006.01) |
| *G01C 21/34* | (2006.01) |
| *B60W 50/10* | (2012.01) |
| *G01C 21/36* | (2006.01) |
| *B60W 50/14* | (2020.01) |

(52) U.S. Cl.
CPC ........... *G05D 1/0088* (2013.01); *B60W 50/10* (2013.01); *G01C 21/3407* (2013.01); *G01C 21/3492* (2013.01); *G01C 21/3617* (2013.01); *G05D 1/0061* (2013.01); *B60W 2050/146* (2013.01); *G05D 2201/0213* (2013.01)

(58) Field of Classification Search
CPC ............................ G05D 1/0088; B60W 30/182
See application file for complete search history.

(56) References Cited

U.S. PATENT DOCUMENTS

| | | | |
|---|---|---|---|
| 6,600,994 | B1 | 7/2003 | Polidi |
| 8,346,426 | B1 | 1/2013 | Szybalski et al. |
| 8,880,270 | B1 | 11/2014 | Ferguson et al. |
| 9,352,752 | B2 | 5/2016 | Cullinane et al. |
| 2002/0161517 | A1 | 10/2002 | Yano et al. |
| 2005/0125148 | A1 | 6/2005 | Van Buer et al. |

(Continued)

FOREIGN PATENT DOCUMENTS

| | | |
|---|---|---|
| DE | 102014217528 A1 | 3/2016 |
| JP | H10-188194 A | 7/1998 |

(Continued)

*Primary Examiner* — Anne Marie Antonucci
*Assistant Examiner* — Abdalla A Khaled
(74) *Attorney, Agent, or Firm* — Sughrue Mion, PLLC

(57) ABSTRACT

An autonomous driving system performing autonomous driving of a vehicle, includes a vehicle position acquisition device acquiring a position of the vehicle on a map, a vehicle state acquisition device acquiring a vehicle state of the vehicle, an occupant state acquisition device acquiring an occupant state of the vehicle, a destination candidate database storing destination candidate data including a destination candidate and the occupant state correlated with the destination candidate; and an electronic control unit. The electronic control unit determines whether or not the vehicle is in a boarding completion state based on the vehicle state and the occupant state, and sets a destination of the vehicle in autonomous driving based on the position of the vehicle on the map, the occupant state, and the destination candidate data in a case where electronic control unit determines that the vehicle is in the boarding completion state.

8 Claims, 12 Drawing Sheets

(56) References Cited

U.S. PATENT DOCUMENTS

| | | |
|---|---|---|
| 2013/0110343 A1 | 5/2013 | Ichikawa et al. |
| 2013/0185152 A1* | 7/2013 | Aaron .................... G06Q 20/02 705/14.51 |
| 2015/0145648 A1* | 5/2015 | Winkelman ....... G07C 9/00309 340/5.72 |
| 2015/0232064 A1 | 8/2015 | Cudak et al. |
| 2015/0330501 A1* | 11/2015 | Kutsubo ................. F16H 61/00 137/565.01 |
| 2015/0345970 A1 | 12/2015 | Tanaka et al. |
| 2016/0148450 A1 | 5/2016 | Ohshima |
| 2017/0147959 A1* | 5/2017 | Sweeney .............. G05D 1/0022 |
| 2018/0137595 A1 | 5/2018 | Kim et al. |
| 2018/0266834 A1* | 9/2018 | Cronin ............. G08G 1/096827 |

FOREIGN PATENT DOCUMENTS

| | | |
|---|---|---|
| JP | 2002-122060 A | 4/2002 |
| JP | 2003044572 A | 2/2003 |
| JP | 2003294477 A | 10/2003 |
| JP | 2005-031071 A | 2/2005 |
| JP | 2009262649 A | 11/2009 |
| JP | 2010-145421 A | 7/2010 |
| JP | 2010190745 A | 9/2010 |
| JP | 2012-048563 A | 3/2012 |
| JP | 2012073173 A | 4/2012 |
| JP | 5382218 B2 | 10/2013 |
| JP | 2014065428 A | 4/2014 |
| JP | 2014-206545 A | 10/2014 |
| JP | 2014-215162 A | 11/2014 |
| JP | 2014-229053 A | 12/2014 |
| JP | 2014240777 A | 12/2014 |
| JP | 2015-513670 A | 5/2015 |
| JP | 2015-191264 A | 11/2015 |
| JP | 2016-097927 A | 5/2016 |
| JP | 2016-130091 A | 7/2016 |
| KR | 10-2012-0027735 A | 3/2012 |
| WO | 2011/158347 A1 | 12/2011 |
| WO | 2013/130200 A1 | 9/2013 |
| WO | 2014/174817 A1 | 10/2014 |
| WO | 2016/186355 A1 | 11/2016 |

\* cited by examiner

AUTONOMOUS DRIVING SYSTEM

INCORPORATION BY REFERENCE

The disclosure of Japanese Patent Application No. 2016-253728 filed on Dec. 27, 2016 including the specification, drawings and abstract is incorporated herein by reference in its entirety.

BACKGROUND

1. Technical Field

The present disclosure relates to an autonomous driving system.

2. Description of Related Art

In the related art, U.S. Pat. No. 8,346,426 discloses an autonomous driving system. The specification of U.S. Pat. No. 8,346,426 discloses that a route along which a vehicle arrives at a destination is selected in a case where an occupant inputs the destination, and autonomous driving of the vehicle is performed along the selected route.

SUMMARY

According to the above-described system of the related art, a burden on an occupant regarding driving is reduced due to autonomous driving. However, the occupant is needed to manually set a destination from among a plurality of options in order to cause the system to perform autonomous driving. There is room for improvement in setting of a destination from the viewpoint of an occupant's convenience.

The present disclosure provides an autonomous driving system capable of further improving an occupant's convenience regarding setting of a destination.

An autonomous driving system according to an aspect of the present disclosure is configured to perform autonomous driving of a vehicle. An aspect of the present disclosure relates to an autonomous driving system that performs autonomous driving of a vehicle, including a vehicle position acquisition device, a vehicle state acquisition device, an occupant state acquisition device, a destination candidate database, and an electronic control unit. The vehicle position acquisition device is configured to acquire a position of the vehicle on a map. The vehicle state acquisition device is configured to acquire a vehicle state of the vehicle. The occupant state acquisition device is configured to acquire an occupant state of the vehicle. The destination candidate database is configured to store destination candidate data including a destination candidate and the occupant state correlated with the destination candidate. The electronic control unit is configured to determine whether or not the vehicle is in a boarding completion state based on the vehicle state and the occupant state, and set a destination of the vehicle in autonomous driving based on the position of the vehicle on the map, the occupant state, and the destination candidate data in a case where electronic control unit determines that the vehicle is in the boarding completion state.

With the autonomous driving system according to the aspect of the present disclosure, in a case where a vehicle is determined as being in a boarding completion state, a destination of the vehicle in autonomous driving can be automatically set based on a position of the vehicle on a map, an occupant state, and destination candidate data, and thus manual setting of a destination performed by an occupant can be omitted. With the autonomous driving system, since a destination based on an occupant state is set by taking into consideration a relationship between an occupant state and a destination desired by the occupant, the accuracy of automatically setting a destination desired by the occupant can be increased, and thus the occupant's convenience can be further improved.

In the autonomous driving system according to the aspect of the present disclosure, the destination candidate data may include the destination candidate and the occupant state and the time correlated with the destination candidate; and, in a case where the electronic control unit determines that the vehicle is in the boarding completion state, the electronic control unit may set a destination of the vehicle in autonomous driving based on the current time, the position of the vehicle on the map, the occupant state, and the destination candidate data. With the autonomous driving system, a destination in autonomous driving can be set based on commuting hours and school attendance hours by further taking into consideration the current time.

The autonomous driving system according to the aspect of the present disclosure may further include a terminal communication device configured to perform communication with a portable information terminal of an occupant of the vehicle. In the autonomous driving system, the electronic control unit may be configured to acquire schedule data of the occupant from the portable information terminal through communication using the terminal communication device, and the electronic control unit may set a destination of the vehicle in autonomous driving based on the current time, the position of the vehicle on the map, the occupant state, the destination candidate data, and the schedule data. With the autonomous driving system, schedule data of an occupant is acquired from a portable information terminal of the occupant, and thus a destination in autonomous driving can be set based on the schedule data of the occupant.

The autonomous driving system according to the aspect of the present disclosure may further include a network communication device configured to perform communication with an information network, and a personal authentication device configured to perform personal authentication of the occupant of the vehicle. In the autonomous driving system, the electronic control unit may be configured to acquire schedule data of the occupant having undergone the personal authentication by the personal authentication device through communication using the network communication device, and the electronic control unit may set a destination of the vehicle in autonomous driving based on the current time, the position of the vehicle on the map, the occupant state, the destination candidate data, and the schedule data. With the autonomous driving system, schedule data of an occupant having undergone personal authentication is acquired from an information network, and thus a destination in autonomous driving can be set based on the schedule data of the occupant.

In the autonomous driving system according to the aspect of the present disclosure, in a case where the schedule data of a plurality of the occupants is acquired, the electronic control unit may set a destination of the vehicle in autonomous driving based on the current time, the position of the vehicle on the map, the occupant state, the destination candidate data, and prioritization data set in advance. With the autonomous driving system, in a case where items of schedule data of a plurality of occupants are acquired, scheduled destinations on the items of schedule data of the occupants can be appropriately prioritized, and a destination in autonomous driving can be set, based on the current time, a position of a vehicle on a map, an occupant state, destination candidate data, and prioritization data set in advance.

The autonomous driving system according to the aspect of the present disclosure may further include a presentation device configured to present information to the occupant, and an input device configured to receive a permission operation of the occupant. The electronic control unit may be configured to cause the presentation device to present at least one of the destination candidates to the occupant based on the position of the vehicle on the map, the occupant state, and the destination candidate data, in a case where the electronic control unit determines that the vehicle is in the boarding completion state. The electronic control unit may be configured to determine whether or not the destination candidate is permitted by the occupant based on an input from the input device. The electronic control unit may be configured to set the destination candidate as a destination of the vehicle in autonomous driving in a case where the electronic control unit determines that the destination candidate is permitted by the occupant.

With the autonomous driving system according to the aspect of the present disclosure, in a case where a vehicle is determined as being in a boarding completion state, at least one destination candidate can be presented to an occupant, and a destination candidate permitted by an occupant can be set as a destination in autonomous driving, based on a position of the vehicle on a map, an occupant state, and destination candidate data. With the autonomous driving system, since a destination candidate based on an occupant state can be presented by taking into consideration a relationship between an occupant state and a destination in autonomous driving of a vehicle, the accuracy of presenting a destination candidate desired by the occupant can be increased, and thus the occupant's convenience regarding setting of a destination can be further improved.

In the autonomous driving system according to the aspect of the present disclosure, the destination candidate data may include the destination candidate and the occupant state and the time correlated with the destination candidate. In a case where the electronic control unit determines that the vehicle is in the boarding completion state, the electronic control unit may present the destination candidate to the occupant based on the current time, the position of the vehicle on the map, the occupant state, and the destination candidate data. With the autonomous driving system, a destination candidate in autonomous driving can be presented based on commuting hours and school attendance hours by further taking into consideration the current time in automatic setting of a destination.

The autonomous driving system according to the aspect of the present disclosure may further include a terminal communication device configured to perform communication with a portable information terminal of an occupant of the vehicle. The electronic control unit may be configured to acquire schedule data of the occupant from the portable information terminal through communication using the terminal communication device. The schedule data may include a scheduled destination correlated with a scheduled time, and the electronic control unit may be configured to present at least one of the destination candidate and the scheduled destination to the occupant based on the current time, the position of the vehicle on the map, the occupant state, the destination candidate data, and the schedule data. With the autonomous driving system, schedule data of an occupant is acquired from a portable information terminal of the occupant, and thus a destination candidate in autonomous driving can be presented based on the schedule data of the occupant.

The autonomous driving system according to the aspect of the present disclosure may further include a network communication device configured to perform communication with an information network; and a personal authentication device configured to perform personal authentication of the occupant of the vehicle. The electronic control unit may be configured to acquire schedule data of the occupant having undergone the personal authentication by the personal authentication device through communication using the network communication device, and the schedule data may include a scheduled destination correlated with a scheduled time. The electronic control unit may be configured to present at least one of the destination candidate and the scheduled destination to the occupant based on the current time, the position of the vehicle on the map, the occupant state, the destination candidate data, and the schedule data. With the autonomous driving system, schedule data of an occupant is acquired from an information network, and thus a destination in autonomous driving can be set based on the schedule data of the occupant.

In the autonomous driving system according to the aspect of the present disclosure, in a case where the schedule data of a plurality of the occupants is acquired, the electronic control unit may be configured to present at least one of the destination candidate and the scheduled destination to the occupant based on the current time, the position of the vehicle on the map, the occupant state, the destination candidate data, and prioritization data set in advance. With the autonomous driving system, in a case where items of schedule data of a plurality of occupants are acquired, scheduled destinations on the items of schedule data of the occupants can be appropriately prioritized, and a destination candidate in autonomous driving can be presented, based on the current time, a position of the vehicle on the map, an occupant state, destination candidate data, and prioritization data set in advance.

In the autonomous driving system according to the aspect of the present disclosure, the electronic control unit may be configured to determine whether or not the occupant permits the destination to be stored in the destination candidate database. In a case where the electronic control unit determines that the occupant permits the destination to be stored in the destination candidate database, the electronic control unit may be configured to store the destination in the destination candidate database as the destination candidate in correlation with the occupant state. In a case where the electronic control unit determines that the occupant does not permit the destination to be stored in the destination candidate database, the electronic control unit may not store the destination in the destination candidate database. With the autonomous driving system, since a destination permitted by an occupant is stored in the destination candidate database as a destination candidate in correlation with an occupant state, an inappropriate destination candidate can be prevented from being included in destination candidate data.

The autonomous driving system according to the aspect of the present disclosure may further include a vehicle schedule database configured to store vehicle schedule data correlated with the vehicle. The electronic control unit may be configured to give a request for personal authentication to the occupant in a case where an engine of the vehicle that is not scheduled in the vehicle schedule data is started. With the autonomous driving system, in a case where an engine of a vehicle that is not scheduled in vehicle schedule data is started, there is a considerably high probability that an improper vehicle may be operated, and thus a contribution to improvement of vehicle security can be further made by making a request for personal authentication.

In the autonomous driving system according to the aspect of the present disclosure, in a case where the electronic control unit determines that the vehicle is in the boarding completion state during stopping of the engine of the vehicle, the electronic control unit may be configured to determine whether or not a preset engine starting condition is satisfied based on the vehicle state. In a case where the electronic control unit determines that the engine starting condition is satisfied, the electronic control unit may be configured to start the engine of the vehicle. With the autonomous driving system, in a case where a vehicle is brought into a boarding completion state during stoppage of an engine of the vehicle, and the engine starting condition is determined as being satisfied, the engine of the vehicle is automatically started, and thus the convenience regarding engine starting of an occupant can be considerably improved.

As described above, according to the aspect of the present disclosure, an occupant's convenience regarding setting of a destination can be further improved.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, embodiments of the present disclosure will be described with reference to the drawings.

First Embodiment

Figure 1:
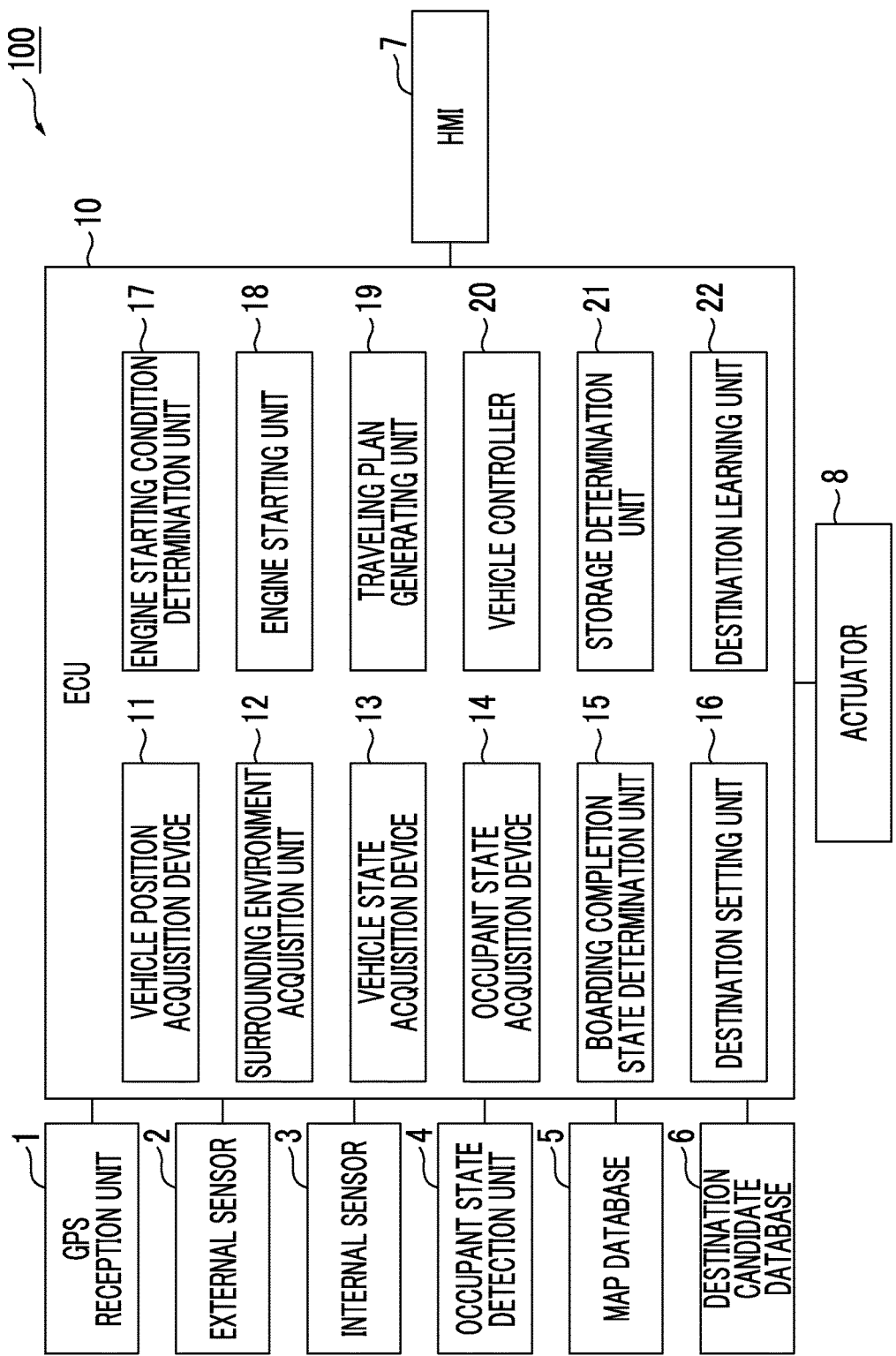
FIG. 1 is a block diagram illustrating an autonomous driving system according to a first embodiment.

FIG. 1 is a block diagram illustrating an autonomous driving system according to a first embodiment. An autonomous driving system 100 according to the first embodiment, illustrated in FIG. 1, is mounted on a vehicle such as an automobile, and performs autonomous driving of the vehicle. The autonomous driving system 100 starts autonomous driving of the vehicle in a case where an occupant performs an operation (for example, an operation of pressing an autonomous driving start button) of starting autonomous driving.

The autonomous driving indicates vehicle control of autonomously causing the vehicle to travel toward a destination set in advance. In the autonomous driving, a driver is not needed to perform a driving operation, and the vehicle autonomously travels. Details of setting a destination will be described later.

Configuration of Autonomous Driving System According to First Embodiment

As illustrated in FIG. 1, the autonomous driving system 100 includes an electronic control unit (ECU) 10 that totally manages the system. The ECU 10 is an electronic control unit including a central processing unit (CPU), a read only memory (ROM), a random access memory (RAM), a controller area network (CAN) communication circuit, and the like. In the ECU 10, for example, a program stored in the ROM is loaded to the RAM, and the CPU executes the program loaded to the RAM so as to realize various functions. The ECU 10 may be formed of a plurality of electronic units.

The ECU 10 is connected to a GPS reception unit 1, an external sensor 2, an internal sensor 3, an occupant state detection unit 4, a map database 5, a destination candidate database 6, a human machine interface (HMI) 7, and an actuator 8.

The GPS reception unit 1 receives signals from three or more GPS satellites so as to measure a position of the vehicle (for example, latitude and longitude of the vehicle). The GPS reception unit 1 transmits the measured position information of the vehicle to the ECU 10.

The external sensor 2 is a detector detecting external circumstances or the like around the vehicle. The external sensor 2 includes at least one of a camera and a radar sensor.

The camera is an imaging device that images the external circumstances of the vehicle. The camera is provided on the rear side of a windshield of the vehicle. The camera transmits imaging information regarding the external circumstances of the vehicle to the ECU 10. The camera may be a monocular camera or a stereo camera. The stereo camera has two imaging units provided to reproduce binocular parallax. Imaging information in the stereo camera includes information regarding a depth direction.

The radar sensor is a detection device that detects obstacles around the vehicle by using electric waves (for example, millimeter waves). The radar sensor includes, for example, a millimeter-wave radar or a light detection and ranging (LIDAR). The radar sensor transmits electric waves or light around the vehicle and receives electric waves reflected by obstacles to detect obstacles. The radar sensor transmits detected obstacle information to the ECU 10. Examples of the obstacles include fixed obstacles such as guardrails and buildings, and movable obstacles such as pedestrians, bicycles, and other vehicles.

The internal sensor 3 is a detection device that detects a traveling state and a vehicle state of the vehicle. The internal sensor 3 includes a vehicle speed sensor, an acceleration sensor, and a yaw rate sensor. The vehicle speed sensor is a detector that detects a speed of the vehicle. As the vehicle speed sensor, a wheel speed sensor that is provided in a wheel of the vehicle, a drive shaft rotating integrally with the wheel, or the like and detects the rotation speed of the wheel is used. The vehicle speed sensor transmits detected vehicle speed information (wheel speed information) to the ECU 10.

The acceleration sensor is a detector that detects the acceleration of the vehicle. The acceleration sensor includes a front-rear acceleration sensor that detects the acceleration of the vehicle in a front-rear direction, and a lateral acceleration sensor that detects the lateral acceleration of the vehicle. The acceleration sensor transmits, for example, acceleration information of the vehicle to the ECU 10. The yaw rate sensor is a detector that detects a yaw rate (rotational angular velocity) of the center of gravity of the vehicle around the vertical axis. As the yaw rate sensor, for example, a gyro sensor may be used. The yaw rate sensor transmits detected yaw rate information of the vehicle to the ECU 10. The internal sensor 3 includes a door sensor that detects opening and closing of a door of the vehicle as a vehicle state.

The occupant state detection unit 4 is a detector that detects an occupant state of the vehicle. The occupant state detection unit 4 includes an in-vehicle camera and a seat pressure sensor. The in-vehicle camera is a camera that is provided to be directed toward a vehicle cabin of the vehicle, and images the vehicle cabin. The in-vehicle camera may be provided in a plurality. The in-vehicle camera may include a driver monitor camera. The in-vehicle camera may include an infrared camera. The seat pressure sensor is a sensor that is provided in each seat of the vehicle, and detects pressure applied to the seat of the vehicle due to an occupant sitting on the seat. The occupant state detection unit 4 may include a seat belt sensor that detects a seat belt wearing state of an occupant. The occupant state detection unit 4 may include a steering sensor that detects a state of a steering wheel gripped by a driver.

The occupant state is a state of an occupant of the vehicle (a person riding in the vehicle). The occupant state includes the number of occupants. The occupant state includes a sitting position (a sitting position such as a driver seat, a passenger seat, or a rear seat) of the occupant. The occupant state may include the sex of the occupant and the age distinction (the distinction among a child, an adult, the elderly, and the like) of the occupant. The occupant state may include personal information of the occupant (personal information of an owner of the vehicle, personal information of a family member of the owner of the vehicle, personal information of a user of the vehicle, and the like). The occupant state may include a seat belt wearing state of the occupant. The occupant state may include an attitude of the occupant (an attitude of a driver seated on the driver seat).

The map database 5 is a database that stores map information. The map database 5 is formed in, for example, a hard disk drive (HDD) mounted on the vehicle. The map information includes position information of roads, information regarding road shapes (for example, the types of curves or linear portions, and curvatures of curves), position information of intersections and branch points, position information of structures, and the like. The map information also includes traffic regulation information such as the legal limit correlated with position information. The map information also includes facility data including positions of facilities and the types of facilities (the types such as a school, a hospital, a station, and a convenience store). The map database 5 may be stored in a computer of a facility such as a control center that can perform communication with the vehicle.

The destination candidate database 6 is a database storing destination candidate data regarding destination candidates. The destination candidates are candidates as destinations for autonomous driving of the vehicle. The destination candidate may be a point or a facility on a map. The destination candidate database 6 stores the destination candidates in correlation with a position of the vehicle on the map, a riding state, and the time. The time may include information regarding the season, the day of the week, and year, month, and day. The destination candidate database 6 may be stored in a server of a facility such as a control center that can perform communication with the vehicle. The destination candidate database 6 may be a database integrated with the map database 5.

The HMI 7 is an interface for inputting and outputting information between the autonomous driving system 100 and the occupant. The HMI 7 may include, for example, a display and a speaker. The HMI 7 displays an image on the display and outputs a voice from the speaker in response to control signals from the ECU 10. The display may be a head-up display. The HMI 7 is provided with, for example, input devices (buttons, a touch panel, a voice input machine, and the like) for receiving inputs from the occupant.

The actuator 8 is a device used to control the vehicle. The actuator 8 includes at least a throttle actuator, a brake actuator, and a steering actuator. The throttle actuator controls an amount (throttle opening) of air supplied to an engine in response to a control signal from the ECU 10, and controls the drive force of the vehicle. In a case where the vehicle is a hybrid vehicle, in addition to an amount of air supplied to the engine, a control signal from the ECU 10 is input to a motor (which functions as an engine) as a power source, and the drive force is controlled. In a case where the vehicle is an electric vehicle, a control signal from the ECU 10 is input to the motor as a power source, and the drive force is controlled. The motor as a power source in the above case forms the actuator 8.

The brake actuator controls a brake system in response to a control signal from the ECU 10, and controls a braking force applied to the wheel of the vehicle. As the brake system, a hydraulic brake system may be used. The steering actuator controls the driving of an assist motor controlling steering torque in an electric power steering system in response to a control signal from the ECU 10. Consequently, the steering actuator controls the steering torque of the vehicle.

Next, a description will be made of a functional configuration of the ECU 10. The ECU 10 includes a vehicle position acquisition device 11, a surrounding environment acquisition unit 12, a vehicle state acquisition device 13, an occupant state acquisition device 14, a boarding completion state determination unit 15, a destination setting unit 16, an engine starting condition determination unit 17, an engine starting unit 18, a traveling plan generating unit 19, a vehicle controller 20, a destination learning unit 22, and a storage determination unit 21. There may be an aspect in which some functions of the ECU 10 described below are executed by a server of a facility such as a control center that can perform communication with the vehicle. The ECU 10 is connected to a timer for acquiring the time.

The vehicle position acquisition device 11 acquires a position of the vehicle on the map based on position information from the GPS reception unit 1 and map information from the map database 5. The vehicle position acquisition device 11 acquires a position of the vehicle according to a simultaneous localization and mapping (SLAM) technique by using position information of fixed obstacles such as telegraph poles included in the map information from the map database 5 and a detection result in the external sensor 2. The vehicle position acquisition device 11 may acquire a position of the vehicle on the map according to other well-known methods.

The surrounding environment acquisition unit 12 acquires the surrounding environment of the vehicle based on a detection result in the external sensor 2. The surrounding environment includes a position of an obstacle for the vehicle, a relative speed of the obstacle for the vehicle, a movement direction of an obstacle for the vehicle, and the like. The surrounding environment acquisition unit 12 acquires the surrounding environment of the vehicle according to a well-known method based on a captured image in the camera and obstacle information from the radar sensor.

The vehicle state acquisition device 13 acquires a vehicle state during traveling based on a detection result in the internal sensor 3. The vehicle state includes a vehicle speed of the vehicle, acceleration of the vehicle, and a yaw rate of the vehicle. Specifically, the vehicle state acquisition device 13 acquires a vehicle speed of the vehicle based on vehicle speed information from the vehicle speed sensor. The vehicle state acquisition device 13 acquires acceleration (front-rear acceleration and lateral acceleration) of the vehicle based on acceleration information from the acceleration sensor. The vehicle state acquisition device 13 acquires a yaw rate of the vehicle based on yaw rate information from the yaw rate sensor. The vehicle state acquisition device 13 acquires open and closed states of the door of the vehicle based on a detection result from the internal sensor 3 (a detection result from the door sensor).

The vehicle state acquisition device 13 acquires the presence or absence of failures in each on-vehicle sensor and the autonomous driving system 100 as the vehicle state. The vehicle state acquisition device 13 acquires the presence or absence of failures in each on-vehicle sensor and the autonomous driving system 100 according to a well-known method.

The occupant state acquisition device 14 acquires an occupant state of the vehicle based on a detection result from the occupant state detection unit 4. The occupant state acquisition device 14 acquires the number of occupants of the vehicle and a sitting position based on detection results (for example, captured images from the in-vehicle camera and detection results from the seat pressure sensor) from the occupant state detection unit 4. In a case where there is a driver seat in the vehicle, the occupant state acquisition device 14 acquires that the occupant is seated on the driver seat of the vehicle based on a detection result from the occupant state detection unit 4.

The occupant state acquisition device 14 may acquire the sex of the occupant, the age of the occupant, and the like as the occupant state. In this case, the occupant state acquisition device 14 may acquire the sex of the occupant and an age distinction of the occupant according to a well-known image processing method based on a captured image from the in-vehicle camera. The occupant state acquisition device 14 may acquire personal information of the occupant as the occupant state. The occupant state acquisition device 14 may specify a person (for example, an owner of the vehicle or a family member of the owner) by combining the weight or physique of a person stored in advance with a detection result from the occupant state detection unit 4. The occupant state acquisition device 14 may acquire a seat belt wearing state of the occupant based on a detection result from the occupant state detection unit 4. The occupant state acquisition device 14 may acquire a seat belt wearing state of the occupant according to a well-known image processing method based on a captured image from the in-vehicle camera. The occupant state acquisition device 14 may acquire an attitude of the occupant (a state of a driver gripping the steering wheel, a state of an occupant in the rear seat lying down, and the like) based on a detection result from the occupant state detection unit 4. The occupant state acquisition device 14 may acquire the occupant state according to a well-known method.

The boarding completion state determination unit 15 determines whether or not the vehicle is in a boarding completion state based on the vehicle state in the vehicle state acquisition device 13 and the occupant state in the occupant state acquisition device 14 in a case where autonomous driving is started. The boarding completion state is a state in which the occupant has boarded the vehicle. The boarding completion state may be a state in which at least one occupant is seated on the seat, and all of the doors of the vehicle are closed. The boarding completion state may have a prerequisite that all occupants wear seat belts. In a case where there is a driver seat in the vehicle, the boarding completion state determination unit 15 may have a prerequisite that the occupant has been seated on the driver seat. The boarding completion state determination unit 15 determines whether or not the vehicle is in a boarding completion state in a case where autonomous driving is started even during traveling of the vehicle.

In a case where the boarding completion state determination unit 15 determines that the vehicle is in a boarding completion state, the destination setting unit 16 determines whether or not a destination in autonomous driving can be automatically set. The destination setting unit 16 determines whether or not a destination in autonomous driving can be automatically set based on the current time, a position of the vehicle on the map in the vehicle position acquisition device 11, an occupant state in the occupant state acquisition device 14, and destination candidate data in the destination candidate database 6.

A case where a destination in autonomous driving can be automatically set is, for example, a case where requirements correlated with at least one destination candidate included in destination candidate data match the current time, a position of the vehicle on the map, and an occupant state. A case where a destination in autonomous driving is unable to be automatically set is, for example, a case where none of the requirements correlated with destination candidates included in destination candidate data match the requirements of the current time, a position of the vehicle on the map, and an occupant state when the requirements are compared with each other. In other words, in a case where an appropriate destination candidate is not stored in the destination candidate database 6, the destination setting unit 16 determines that a destination in autonomous driving is unable to be automatically set.

In a case where the destination setting unit 16 determines that a destination in autonomous driving is able to be automatically set, the destination setting unit 16 automatically sets a destination in autonomous driving based on the current time, a position of the vehicle on the map in the vehicle position acquisition device 11, an occupant state in the occupant state acquisition device 14, and destination candidate data in the destination candidate database 6.

Specifically, in a case where "home" as a position on the vehicle on the map, a "single male" as an occupant state, and "between 7:00 and 8:00 in the morning on weekdays" as the time are correlated as the requirements with "A Company" that is a destination candidate in the destination candidate data, the destination setting unit 16 sets "A Company" as a destination in autonomous driving when the current time is "between 7:00 and 8:00 in the morning on weekdays", a position of the vehicle on the map is "home", and an occupant state is a "single male".

Specifically, in a case where "between 7:00 and 8:00 in the morning on weekdays" as the time, "home" as a position on the vehicle on the map, and "a single male and a single boy" as an occupant state, are correlated as requirements with "B Elementary School" that is a destination candidate in the destination candidate data, the destination setting unit 16 sets "B Elementary School" as a destination in autonomous driving when the current time is "between 7:00 and 8:00 in the morning on weekdays", a position of the vehicle on the map is "home", and an occupant state is "a single male and a single boy".

Since there is a case where the driver causes the vehicle to travel in manual driving on the way to A Company from home, and then starts autonomous driving, the destination setting unit 16 may recognize a requirement of a position of the vehicle on the map matching "A Company" when the position of the vehicle on the map is a position "between home and A Company". In a case where a route along which the vehicle reaches a destination candidate is calculated based on a position of the vehicle on the map and the destination candidate, and the vehicle is located on the route, the destination setting unit 16 may recognize that a requirement of a position correlated with the destination candidate matches the position of the vehicle on the map.

In a case where there is a destination candidate satisfying a requirement correlated with solely one of the current time, a position of the vehicle on the map, and an occupant state, and there is no destination candidate satisfying any other requirements, the destination setting unit 16 may set the destination candidate satisfying the requirement correlated with solely one thereof as a destination.

Matching among requirements such as the current time, a position of the vehicle on the map, and an occupant state, and requirements for a destination candidate may not be exactly matching. When a difference between a time correlated with a destination candidate and the current time is within a predetermined time, the destination setting unit 16 may recognize the current time to match the time correlated with the destination candidate. When a difference between a position correlated with a destination candidate and a position of the vehicle on the map is within a predetermined distance, the destination setting unit 16 may recognize the position of the vehicle on the map to match the position correlated with the destination candidate. When a difference between the number of occupants correlated with a destination candidate and the current number of occupants is within a predetermined number of persons, the destination setting unit 16 may recognize an occupant state to match an occupant state correlated with the destination candidate.

In a case where the destination setting unit 16 determines that a destination in autonomous driving is unable to be automatically set, the destination setting unit 16 requests the occupant to set a destination via the HMI 7. The destination setting unit 16 sets a destination in autonomous driving based on a result that is input to the HMI 7 by the occupant.

In a case where the boarding completion state determination unit 15 determines that the vehicle is in a boarding completion state while the engine of the vehicle is stopped, the engine starting condition determination unit 17 determines whether or not a preset engine starting condition is satisfied based on a vehicle state. The engine starting condition is a condition for automatically starting the engine of the vehicle. The engine starting condition includes that the on-vehicle sensors and the autonomous driving system 100 do not fail.

The engine starting condition may include that all occupants wear their seat belts. The engine starting condition may include that an energy amount (a gasoline amount, a hydrogen amount, or an electric power amount) of the vehicle is equal to or more than a predetermined threshold value.

In a case where the engine starting condition determination unit 17 determines that the engine starting condition is satisfied, the engine starting unit 18 starts the engine of the vehicle. The engine also includes a motor that functions as a power source of the vehicle. The engine starting unit 18 transmits a control signal to the actuator 8 so as to automatically start the engine of the vehicle.

In a case where the engine starting condition determination unit 17 determines that the engine starting condition is not satisfied, the engine starting unit 18 notifies the occupant of the reason for not automatically starting the engine via the HMI 7. The engine starting unit 18 notifies the occupant of, for example, the presence of a condition in which the engine starting condition is not satisfied as the reason for not automatically starting the engine.

The traveling plan generating unit 19 generates a traveling plan of the vehicle based on the set destination, the map information in the map database 5, the position of the vehicle on the map in the vehicle position acquisition device 11, the surrounding environment of the vehicle in the surrounding environment acquisition unit 12, and the vehicle state in the vehicle state acquisition device 13. The traveling plan generating unit 19 starts to generate a traveling plan in a case where the driver performs an operation of starting autonomous driving.

The traveling plan includes control target values of the vehicle corresponding to positions on a target route (a route toward a destination) of the vehicle. The positions on the target route are positions in an extending direction of the target route on the map. The positions on the target route indicate set vertical positions that are set at a predetermined interval (for example, 1 m) in the extending direction of the target route. The control target values are target values for controlling the vehicle in the traveling plan. The control target value is set to be correlated with each set vertical position on the target route. The traveling plan generating unit 19 sets set vertical positions at a predetermined interval on the target route, and sets control target values (for example, a target horizontal position and a target vehicle speed) for each set vertical position, so as to generate the traveling plan. The set vertical position and the target horizontal position may be set as a single position coordinate together. The set vertical position and the target horizontal position respectively indicate information regarding a vertical position and information regarding a horizontal position that are set as targets in the traveling plan.

The vehicle controller 20 controls traveling of the vehicle. The vehicle controller 20 performs autonomous driving of the vehicle based on the map information in the map database 5, the position of the vehicle on the map in the vehicle position acquisition device 11, the surrounding environment of the vehicle in the surrounding environment acquisition unit 12, the vehicle state in the vehicle state acquisition device 13, and the traveling plan in the traveling plan generating unit 19. The vehicle controller 20 transmits a control signal to the actuator 8, and thus performs autonomous driving of the vehicle according to the traveling plan.

In a case where the vehicle arrives at the destination in an autonomous driving mode, the storage determination unit 21 makes a request for permission to store the destination in the destination candidate database 6 via the HMI 7. The storage determination unit 21 determines whether or not the occupant permits the destination to be stored in the destination candidate database 6 based on a result that is input to the HMI 7 by the occupant.

In a case where the storage determination unit 21 determines that the occupant permits the destination to be stored in the destination candidate database 6, the storage determination unit 21 stores the destination in the destination candidate database 6 as a destination candidate in correlation with an occupant state. The storage determination unit 21 stores an occupant state when the destination is set or an occupant state when the vehicle arrives at the destination in the destination candidate database 6 in correlation with a destination candidate.

In a case where the storage determination unit 21 determines that the occupant does not permit the destination to be stored in the destination candidate database 6, the storage determination unit 21 does not store the destination in the destination candidate database 6 as a destination candidate. In a case where the request for permission is given to the occupant, and then a predetermined time elapses in a state in which there is no input from the occupant, the storage determination unit 21 determines that the destination is not permitted to be stored in the destination candidate database 6.

The destination learning unit 22 performs learning of the destination candidate database 6. The destination learning unit 22 stores a destination candidate stored in the destination candidate database 6 by the storage determination unit 21, in the destination candidate database 6 in correlation with requirements such as a position of the vehicle on the map. The destination learning unit 22 causes the destination candidate database 6 to learn the positions of the vehicle on the map, the occupant state of the vehicle, the time, and the destination candidate when the destination candidate is set as a destination in autonomous driving by the occupant in correlation with each other.

The destination learning unit 22 corrects or deletes the content of the destination candidate data stored in the destination candidate database 6 based on a result that is input to the HMI 7 by the occupant. A learning method is not limited to the above-described method, and various well-known methods may be used. The storage determination unit 21 and the destination learning unit 22 may be provided in a server that can perform communication with the vehicle.

Processes in Autonomous Driving System According to First Embodiment

Next, with reference to the drawings, a description will be made of processes in the autonomous driving system 100 according to the first embodiment. Herein, a destination setting process, an engine starting process, a destination candidate storing process will be described.

Destination Setting Process

Figure 2:
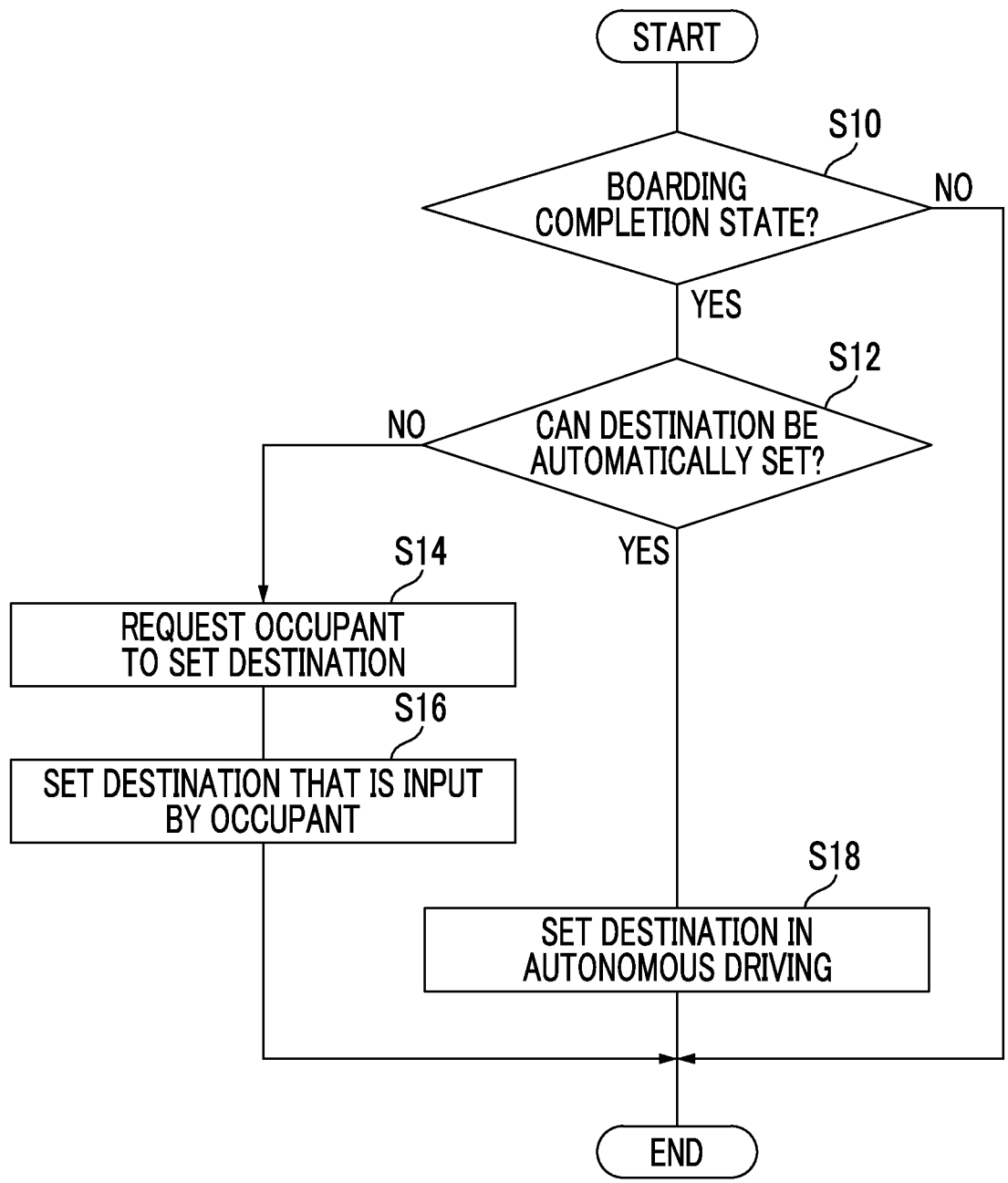
FIG. 2 is a flowchart illustrating a destination setting process according to the first embodiment.

FIG. 2 is a flowchart illustrating a destination setting process according to the first embodiment. The flowchart shown in FIG. 2 is executed when autonomous driving is started.

As illustrated in FIG. 2, in S10, the ECU 10 of the autonomous driving system 100 causes the boarding completion state determination unit 15 to determine whether or not the vehicle is in a boarding completion state. The boarding completion state determination unit 15 performs the determination based on a vehicle state in the vehicle state acquisition device 13 and an occupant state in the occupant state acquisition device 14. In a case where the boarding completion state determination unit 15 determines that the vehicle is not in a boarding completion state (S10: NO), the ECU 10 finishes this process. Thereafter, the ECU 10 performs the process in S10 again after a predetermined time elapses. In a case where the boarding completion state determination unit 15 determines that the vehicle is in a boarding completion state (S10: YES), the ECU 10 proceeds to S12.

In S12, the ECU 10 determines whether or not a destination in autonomous driving can be automatically set with the destination setting unit 16. The destination setting unit 16 performs the determination based on the current time, a position of the vehicle on the map in the vehicle position acquisition device 11, an occupant state in the occupant state acquisition device 14, and destination candidate data in the destination candidate database 6. In a case where the destination setting unit 16 determines that a destination in autonomous driving is unable to be automatically set (S12: NO), the ECU 10 proceeds to S14. In a case where the destination setting unit 16 determines that a destination in autonomous driving is able to be automatically set (S12: YES), the ECU 10 proceeds to S18.

In S14, the ECU 10 requests the occupant to set a destination with the destination setting unit 16. The destination setting unit 16 requests the occupant to set a destination via the HMI 7 by using at least one of image display and voice output. In S16, the ECU 10 sets a destination in autonomous driving based on a result that is input to the HMI 7 by the occupant with the destination setting unit 16. Thereafter, the ECU 10 finishes this process.

In S18, the ECU 10 sets a destination in autonomous driving with the destination setting unit 16. The destination setting unit 16 automatically sets a destination in autonomous driving based on the current time, the position of the vehicle on the map in the vehicle position acquisition device 11, the occupant state in the occupant state acquisition device 14, and the destination candidate data in the destination candidate database 6. Thereafter, the ECU 10 finishes this process.

Engine Starting Process

Figure 3:
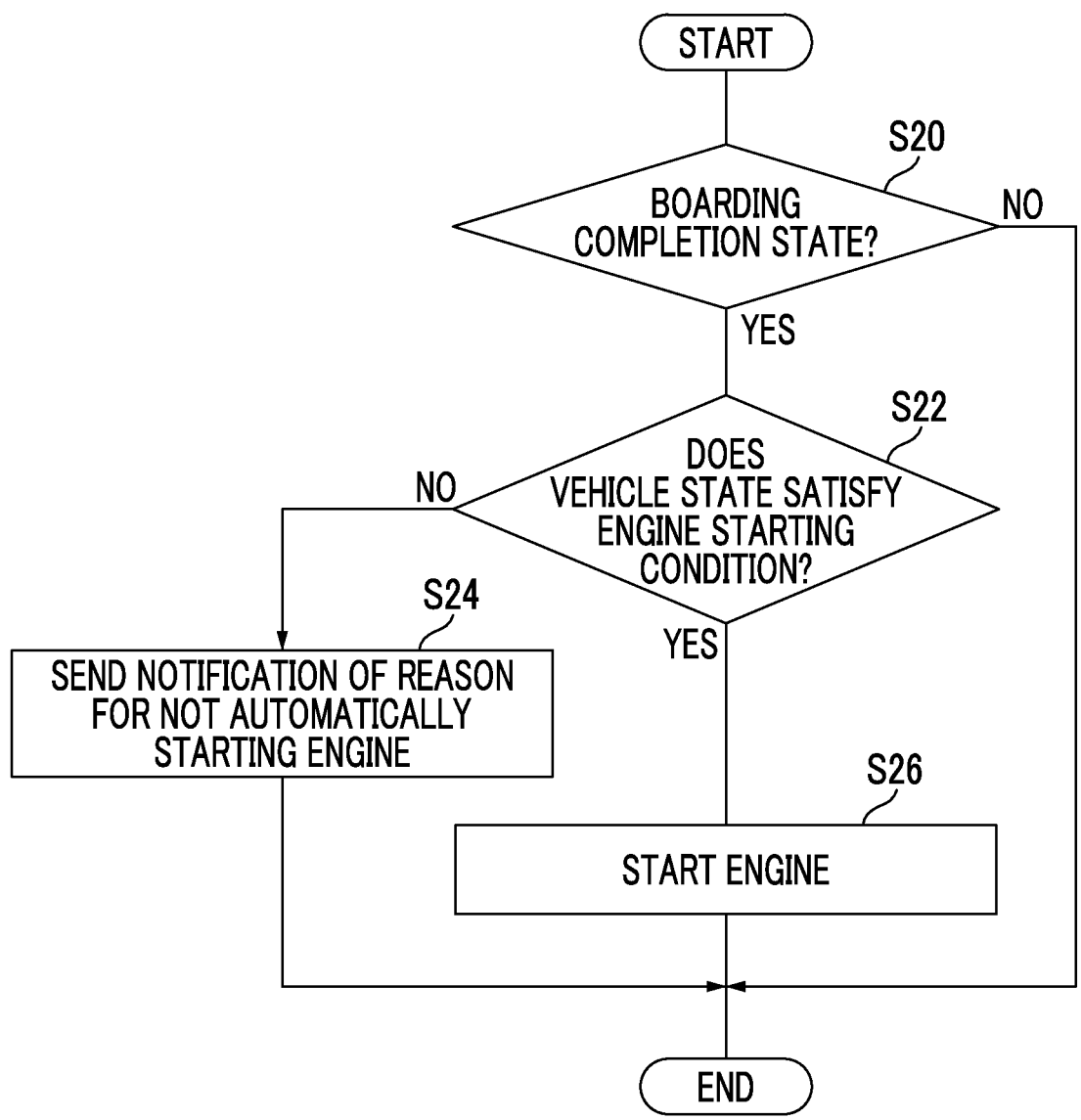
FIG. 3 is a flowchart illustrating an engine starting process according to the first embodiment.

Next, a description will be made of an engine starting process in the autonomous driving system 100 according to the first embodiment. FIG. 3 is a flowchart illustrating the engine starting process according to the first embodiment. The flowchart shown in FIG. 3 is executed in a case where autonomous driving is started during stoppage of the engine of the vehicle.

As illustrated in FIG. 3, in S20, the ECU 10 causes the boarding completion state determination unit 15 to determine whether or not the vehicle is in a boarding completion state. In a case where the boarding completion state determination unit 15 determines that the vehicle is not in a boarding completion state (S20: NO), the ECU 10 finishes this process. Thereafter, the ECU 10 performs the process in S20 again after a predetermined time elapses. In a case where the boarding completion state determination unit 15 determines that the vehicle is in a boarding completion state (S20: YES), the ECU 10 proceeds to S22.

In S22, the ECU 10 causes the engine starting condition determination unit 17 to determine whether or not a preset engine starting condition is satisfied. The engine starting condition determination unit 17 performs the determination based on a vehicle state. In a case where the engine starting condition determination unit 17 determines that the engine starting condition is not satisfied (S22: NO), the ECU 10 proceeds to S24. In a case where the engine starting condition determination unit 17 determines that the engine starting condition is satisfied (S22: YES), the ECU 10 proceeds to S26.

In S24, the ECU 10 notifies the occupant of the reason for not automatically starting the engine with the engine starting unit 18. The engine starting unit 18 sends the notification to the occupant via the HMI 7 by using at least one of image display and voice output. The ECU 10 finishes this process. Thereafter, the ECU 10 performs the process in S20 again after a predetermined time elapses.

In S26, the ECU 10 causes the engine starting unit 18 to start the engine of the vehicle. The engine starting unit 18 transmits a control signal to the actuator 8, and thus automatically starts the engine of the vehicle. Thereafter, the ECU 10 finishes this process.

Destination Candidate Storing Process

Figure 4:
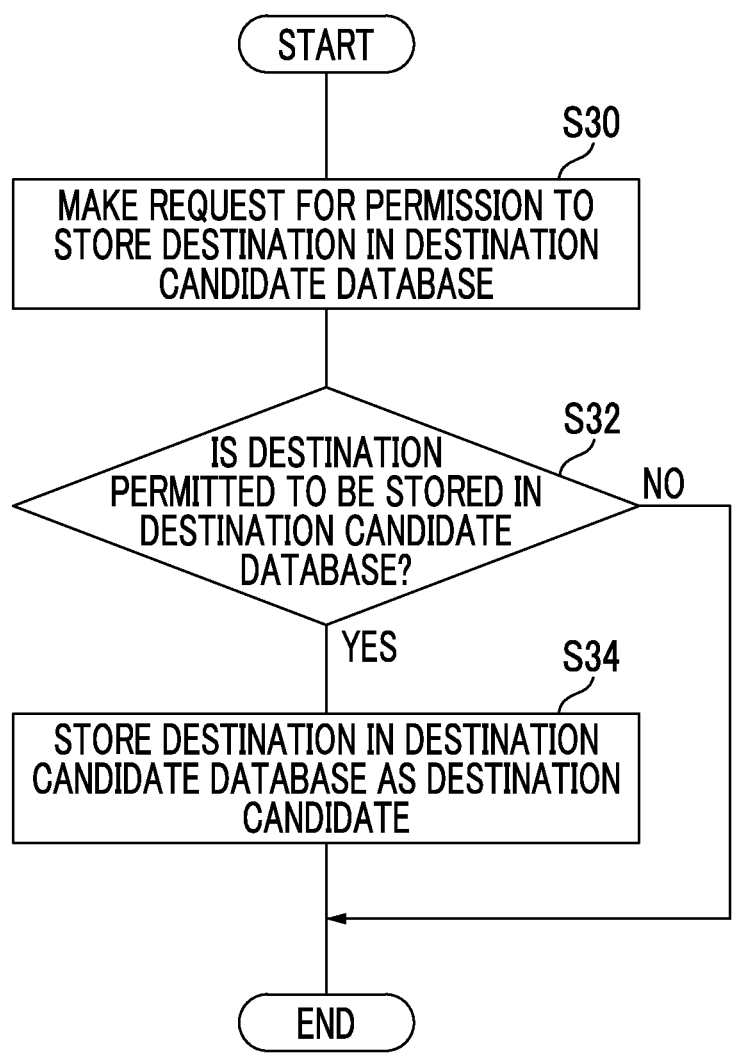
FIG. 4 is a flowchart illustrating a destination candidate storing process according to the first embodiment.

Next, a description will be made of a destination candidate storing process in the autonomous driving system 100 according to the first embodiment. FIG. 4 is a flowchart illustrating a destination candidate storing process according to the first embodiment. The flowchart shown in FIG. 4 is executed in a case where the vehicle arrives at a destination in an autonomous driving mode.

As illustrated in FIG. 4, the ECU 10 makes a request for permission to store the destination in the destination candidate database 6 with the storage determination unit 21. The storage determination unit 21 gives a request for permission to the occupant by using at least one of image display and voice output via the HMI 7.

In S32, the ECU 10 causes the storage determination unit 21 to determine whether or not the occupant permits the destination to be stored in the destination candidate database 6. The storage determination unit 21 performs the determination based on a result that is input to the HMI 7 by the occupant. In a case where the storage determination unit 21 determines that the occupant does not permit the destination to be stored in the destination candidate database 6 (S32: NO), the ECU 10 finishes this process without storing the destination in the destination candidate database 6. In a case where the storage determination unit 21 determines that the occupant permits the destination to be stored in the destination candidate database 6 (S32: YES), the ECU 10 proceeds to S34.

In S34, the ECU 10 causes the storage determination unit 21 to store the destination in the destination candidate database 6 as a destination candidate in correlation with an occupant state. The storage determination unit 21 stores an occupant state of when the destination is set or an occupant state of when the vehicle arrives at the destination in the destination candidate database 6 in correlation with a destination candidate. The storage determination unit 21 stores a destination permitted by the occupant in the destination candidate database 6 as a destination candidate. Thereafter, the ECU 10 finishes this process.

Advantageous Effects of Autonomous Driving System According to First Embodiment

According to the above-described autonomous driving system 100 of the first embodiment, in a case where a vehicle is determined as being in a boarding completion state, a destination in autonomous driving of the vehicle can be automatically set based on a position of the vehicle on the map, an occupant state, and destination candidate data, and thus the occupant can omit manual setting of the destination. According to the autonomous driving system 100, since a destination based on an occupant state is set by taking into consideration a relationship between an occupant state and a destination desired by the occupant, the accuracy of automatically setting a destination desired by the occupant can be further increased, and thus the occupant's convenience can be further improved.

According to the autonomous driving system 100, a destination in autonomous driving can be set based on commuting hours and school attendance hours by further taking into consideration the current time in automatic setting of a destination.

According to the autonomous driving system 100, since the storage determination unit 21 stores a destination permitted by an occupant in the destination candidate database 6 as a destination candidate, an inappropriate destination candidate can be prevented from being included in destination candidate data.

According to the autonomous driving system 100, in a case where a vehicle is brought into a boarding completion state during stoppage of an engine of the vehicle, and the engine starting condition is determined as being satisfied, the engine of the vehicle is automatically started, and thus the convenience regarding engine starting of an occupant can be considerably improved.

Second Embodiment

Figure 5:
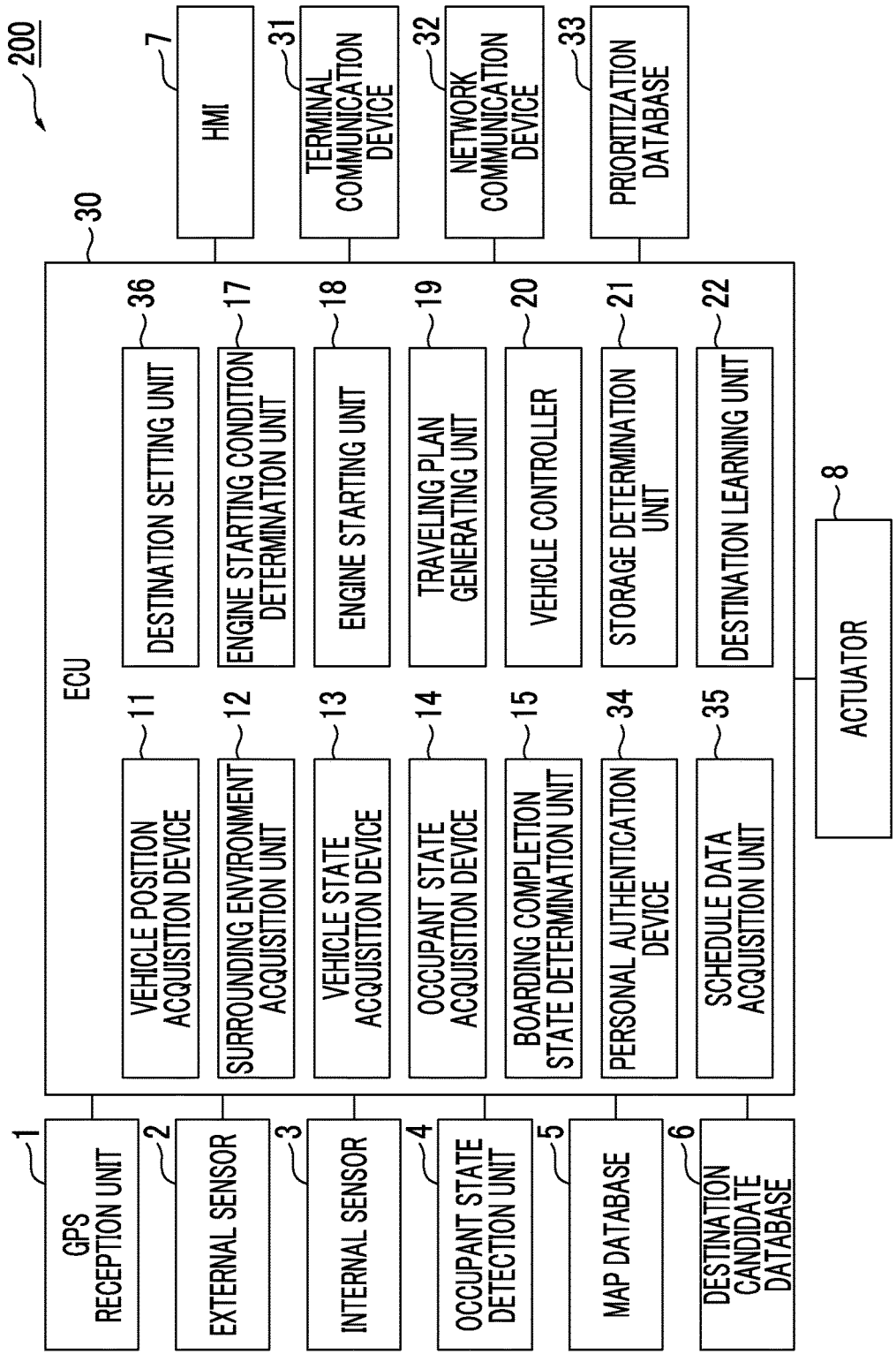
FIG. 5 is a block diagram illustrating an autonomous driving system according to a second embodiment.

Next, a description will be made of an autonomous driving system 200 according to a second embodiment. FIG. 5 is a block diagram illustrating the autonomous driving system 200 according to the second embodiment. The autonomous driving system 200 illustrated in FIG. 5 is different from the autonomous driving system of the first embodiment in that a destination in autonomous driving is set based on schedule data of an occupant. In FIG. 5, constituent elements identical or corresponding to those of the first embodiment are given the same reference numerals, and repeated description will be omitted.

Configuration of Autonomous Driving System According to Second Embodiment

As illustrated in FIG. 5, an ECU 30 of the autonomous driving system 200 according to the second embodiment is connected to a terminal communication device 31, a network communication device 32, and a prioritization database 33.

The terminal communication device 31 is a communication device that performs communication with a portable information terminal carried by an occupant. The portable information terminal is, for example, a smart phone, a notebook PC, a smart watch, and other portable information terminals that can be carried by the occupant. The terminal communication device 31 obtains permission of the occupant in advance, then performs communication with the portable information terminal of the occupant having boarded the vehicle, and acquires schedule data of the occupant recorded in the portable information terminal (or a server via the portable information terminal).

The schedule data is data including a schedule of the occupant. The schedule includes a location and a time. The schedule data includes a scheduled destination and a scheduled time of the occupant. The scheduled destination is a position on a map, registered in correlation with a scheduled time on the schedule data.

The network communication device 32 is a communication device that performs communication with a wireless network such as the Internet. The network communication device 32 obtains permission of the occupant in advance, and then acquires schedule data of the occupant recorded in a server via a wireless network based on personal authentication information of the occupant. The personal authentication information will be described later.

The prioritization database 33 is a database in which prioritization data is recorded. The prioritization data is data (preset data) used for prioritization regarding setting of a destination in a case where schedule data of a plurality of occupants is acquired. In the prioritization data, a distinction (a driver seat, a passenger seat, a rear seat, and the like) among sitting positions of occupants is correlated with the priority. The prioritization data may include an option for requesting an occupant to set a destination under a predetermined situation.

For example, in a case where the vehicle is a taxi, even in a case where a scheduled destination is present on schedule data of a driver, the prioritization data may be data that prioritizes a scheduled destination of an occupant of the passenger seat or an occupant of the rear seat on schedule data thereof. In a case where a plurality of occupants is present on the rear seat, the prioritization data may be data that prioritizes a scheduled destination on schedule data of an occupant in the seat (seat of honor) behind the driver seat. In a case where scheduled destinations of at least two persons match each other among scheduled destinations of a plurality of people on schedule data, the prioritization data may be data that prioritizes the matching scheduled destinations compared with scheduled destinations that do not match each other. In the prioritization data, personal authentication information may be correlated with the priority. The prioritization database 33 may be provided in a server that can perform communication with the vehicle. The prioritization database 33 may be a database integrated with the map database 5 or the destination candidate database 6.

The ECU 30 of the autonomous driving system 200 according to the second embodiment includes a personal authentication device 34 and a schedule data acquisition unit 35. The ECU 30 has a difference in terms of a function of a destination setting unit 36 compared with the first embodiment.

The personal authentication device 34 performs personal authentication of the occupant via the HMI 7 or the like. The personal authentication device 34 performs the personal authentication of the occupant through face recognition using a captured image in the in-vehicle camera, wet recognition using a detection result in the seat pressure sensor, and the like. The autonomous driving system 200 may be provided with an iris recognition device, a fingerprint recognition device, and other input devices for personal authentication. The personal authentication device 34 performs personal authentication of the occupant according to a well-known method.

In a case where the boarding completion state determination unit 15 determines that the vehicle is at boarding completion state, the schedule data acquisition unit 35 acquires schedule data of the occupant. The schedule data acquisition unit 35 acquires the schedule data of the occupant from the portable in formation terminal carried by the occupant via the terminal communication device 31. The schedule data acquisition unit 35 may also acquire position information of the portable information 5 terminal. The schedule data acquisition unit 35 acquires the schedule data of the occupant having undergone the personal authentication using the personal authentication device 34, from the server on the wireless network via the network communication device 32.

In a case where the boarding completion state determination unit 15 determines that the vehicle is in a boarding completion state, the destination setting unit 36 determines whether or not a destination in autonomous driving can be automatically set. The destination setting unit 36 determines whether or not a destination in autonomous driving can be automatically set based on the current time, a position of the vehicle on the map, an occupant state, destination candidate data, and the schedule data acquired by the schedule data acquisition unit 35.

Even in a case where none of the requirements correlated with destination candidates included in destination candidate data match requirements of the current time, a position of the vehicle on the map, and an occupant state when the requirements are compared with each other, the destination setting unit 36 determines that a destination in autonomous driving can be automatically set in a case where the schedule data acquisition unit 35 acquires schedule data of the occupant including a scheduled destination.

In a case where the destination setting unit 36 determines that a destination in autonomous driving is able to be set, the destination setting unit 36 automatically sets a destination in autonomous driving based on the current time, the position of the vehicle on the map, the occupant state, the destination candidate data, and the schedule data of the occupant.

First, a description will be made of a case where items of schedule data of a single occupant are acquired by the schedule data acquisition unit 35. The destination setting unit 36 acquires a scheduled destination (a scheduled destination correlated with a schedule at one unit time after the current time) to which the vehicle is to be directed next at the current time from the schedule data of the occupant. The destination setting unit 36 acquires a destination candidate matching a requirement of at least one of the current time, a position of the vehicle on the map, and an occupant state from destination candidate data based on the current time, the position of the vehicle on the map, the occupant state, and the destination candidate data.

In a case where the destination setting unit 36 acquires a destination candidate but is unable to acquire a scheduled destination, the destination setting unit 36 sets the destination candidate as a destination in autonomous driving. In a case where the destination setting unit 36 acquires a scheduled destination but is unable to acquire a destination candidate, the destination setting unit 36 sets the scheduled destination as a destination in autonomous driving.

In a case where the destination setting unit 36 acquires both of a destination candidate and a scheduled destination, the destination setting unit 36 determines whether or not the destination candidate matches the scheduled destination. In a case where the destination setting unit 36 determines that the destination candidate matches the scheduled destination, the destination setting unit 36 sets the destination candidate as a destination in autonomous driving.

In a case where the destination setting unit 36 determines that the destination candidate does not match the scheduled destination, the destination setting unit 36 may request the occupant to select the destination candidate or the scheduled destination. The destination setting unit 36 sets a destination in autonomous driving based on selection of the occupant. In a case where the destination setting unit 36 determines that the destination candidate does not match the scheduled destination, the destination setting unit 36 may set one of the destination candidate and the scheduled destination as a destination in autonomous driving based on a preset priority rule.

In a case where the destination setting unit 36 determines that the destination candidate does not match the scheduled destination, the destination setting unit 36 may determine the propriety of schedule data of the occupant. In a case where the destination setting unit 36 calculates an arrival time at which the vehicle arrives at a scheduled destination on the schedule data of the occupant in an autonomous driving mode, and the arrival time is a time later than a scheduled time correlated with the scheduled destination on the schedule data, the destination setting unit 36 determines that the schedule data is proper. In this case, the destination setting unit 36 may set the scheduled destination as a destination in autonomous driving. In a case where an arrival time for the scheduled destination is a time earlier than a scheduled time, the destination setting unit 36 determines that the schedule data is not proper. In this case, the destination setting unit 36 sets the destination candidate as a destination in autonomous driving. In a case where the destination setting unit 36 determines that the schedule data is not proper, the destination setting unit 36 may request the occupant to select the scheduled destination and the destination candidate by presenting the scheduled destination and the destination candidate to the occupant. The destination setting unit 36 sets a destination in autonomous driving based on selection of the occupant.

Next, a description will be made of a case where schedule data of a plurality of occupants is acquired by the schedule data acquisition unit 35. In a case where items of schedule data of a plurality of occupants are acquired by the schedule data acquisition unit 35, the destination setting unit 36 sets a destination in autonomous driving based on prioritization data in the prioritization database 33 in addition to the current time, a position of the vehicle on the map, an occupant state, destination candidate data, and the schedule data of the occupants.

The destination setting unit 36 acquires respective scheduled destinations to which the vehicle is to be directed next at the current time from the items of schedule data of the occupants. The destination setting unit 36 selects a scheduled destination to be employed from among a plurality of acquired scheduled destinations based on the prioritization data. In a case where the acquired scheduled destinations all match each other, the destination setting unit 36 employs the matching scheduled destinations based on the prioritization data.

In a case where none of the acquired scheduled destinations match each other, the destination setting unit 36 acquires sitting positions of the occupants of which the schedule data is acquired based on the occupant state and the personal authentication information. The destination setting unit 36 may acquire sitting positions of the occupants of which the schedule data is acquired from position information of the portable information terminal acquired by the schedule data acquisition unit 35, instead of the personal authentication information. The destination setting unit 36 applies the priority to the scheduled destinations according to the sitting positions of the occupants of which the schedule data is acquired. The destination setting unit 36 may lower the priority of a scheduled destination of the driver than that of the scheduled destinations of the occupants on the rear seat based on prioritization data.

The destination setting unit 36 may calculate an arrival time of the vehicle in an autonomous driving mode for each scheduled destination, and may apply the priority to the scheduled destination based on a relationship between a scheduled time for the scheduled destination and the arrival time. In this case, the destination setting unit 36 lowers the priority of a scheduled destination for which an arrival time is a predetermined time or more before a scheduled time or a predetermined time or more after the scheduled time compared with a scheduled destination for which an arrival time is around a scheduled time (within a predetermined time from the scheduled time). The destination setting unit 36 employs a single scheduled destination having the highest priority.

In a case where the destination setting unit 36 has employed the scheduled destination, the destination setting unit 36 sets a destination in autonomous driving from destination candidates or the scheduled destination in the same manner as in the above-described case where schedule data of a single occupant is acquired.

Processes in Autonomous Driving System According to Second Embodiment

Destination Setting Process

Figure 6:
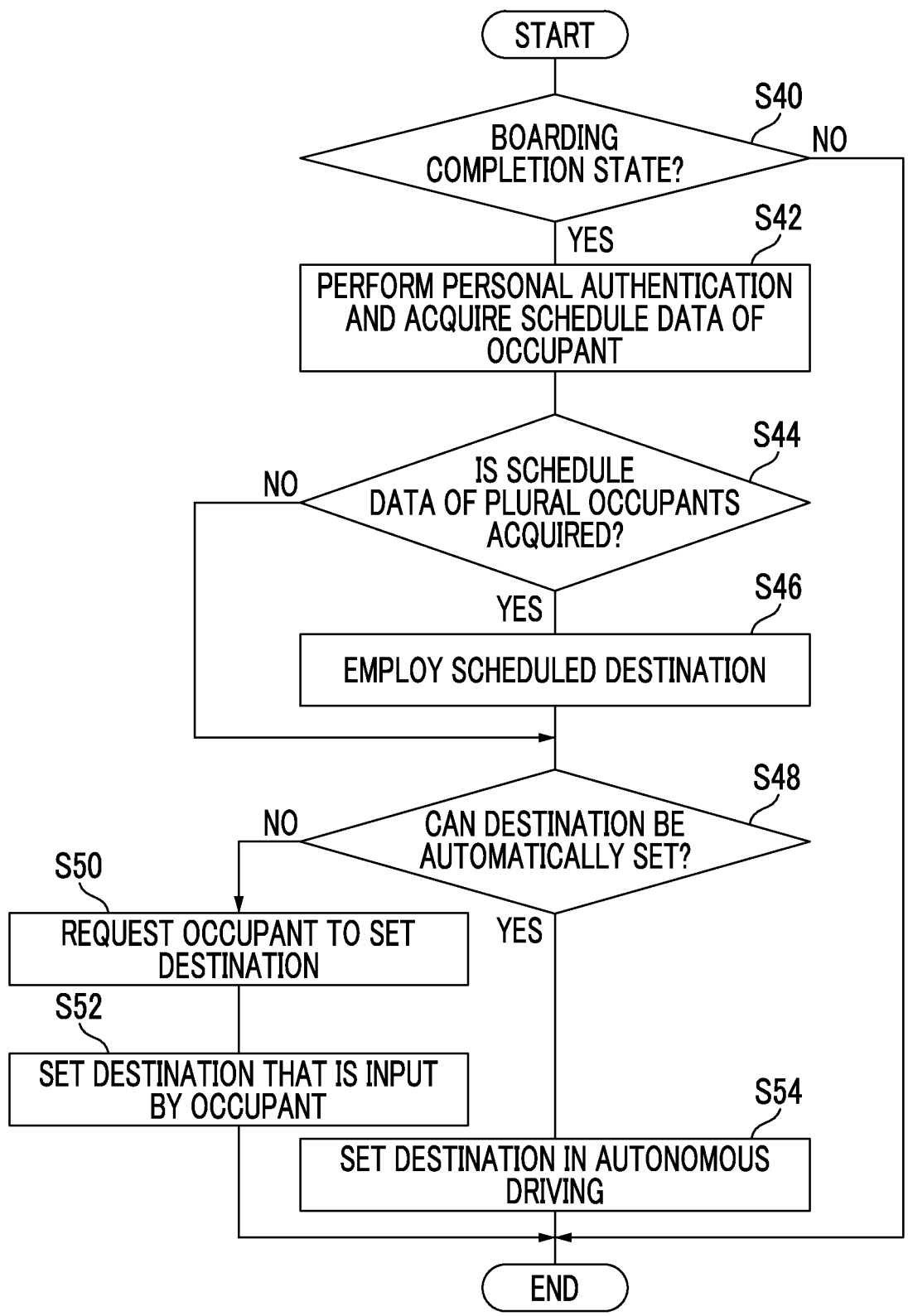
FIG. 6 is a flowchart illustrating a destination setting process according to the second embodiment.

Next, a description will be made of a destination setting process in the autonomous driving system 200 according to the second embodiment. FIG. 6 is a flowchart illustrating a destination setting process according to the second embodiment. The flowchart shown in FIG. 6 is executed when autonomous driving is started. An engine starting process and a destination candidate storing process are the same as those in the first embodiment, and thus a description thereof will be omitted.

As illustrated in FIG. 6, in S40, the ECU 30 of the autonomous driving system 200 causes the boarding completion state determination unit 15 to determine whether or not the vehicle is in a boarding completion state. The boarding completion state determination unit 15 performs the determination based on a vehicle state in the vehicle state acquisition device 13 and an occupant state in the occupant state acquisition device 14. In a case where the boarding completion state determination unit 15 determines that the vehicle is not in a boarding completion state (S40: NO), the ECU 30 finishes this process. Thereafter, the ECU 30 performs the process in S40 again after a predetermined time elapses. In a case where the boarding completion state determination unit 15 determines that the vehicle is in a boarding completion state (S40: YES), the ECU 30 proceeds to S42.

In S42, the ECU 30 causes the personal authentication device 34 to perform personal authentication of the occupant and the schedule data acquisition unit 35 to acquire schedule data of the occupant. The schedule data acquisition unit 35 acquires the schedule data of the occupant from the portable information terminal carried by the occupant via the terminal communication device 31. The schedule data acquisition unit 35 acquires the schedule data of the occupant having undergone the personal authentication using the personal authentication device 34, from the server on the wireless network via the network communication device 32.

In S44, the ECU 30 causes the destination setting unit 36 to determine whether or not items of schedule data of a plurality of occupants are acquired. In a case where the destination setting unit 36 determines that the items of schedule data of the occupants are acquired (S44: YES), the ECU 30 proceeds to S46. In a case where the destination setting unit 36 determines that the items of schedule data of the occupants are not acquired (S44: NO), the ECU 30 proceeds to S48.

In S46, the ECU 30 causes the destination setting unit 36 to employ a single scheduled destination. The destination setting unit 36 employs one of the scheduled destinations on the items of schedule data of the occupants based on the prioritization data. Thereafter, the ECU 30 proceeds to S48.

In S48, the ECU 30 causes the destination setting unit 36 to determine whether or not a destination in autonomous driving can be automatically set. The destination setting unit 36 performs the determination based on the current time, a position of the vehicle on the map, an occupant state, destination candidate data, and the schedule data. In a case where the destination setting unit 36 determines that a destination in autonomous driving is unable to be automatically set (S48: NO), the ECU 30 proceeds to S50. In a case where the destination setting unit 36 determines that a destination in autonomous driving is able to be automatically set (S48: YES), the ECU 30 proceeds to S54. Even in a case where an appropriate destination candidate corresponding to the current time, a position of the vehicle on the map, and an occupant state is not included in destination candidate data, the destination setting unit 36 of the second embodiment determines that a destination in autonomous driving can be automatically set when schedule data including a scheduled destination can be acquired.

In S50, the ECU 30 requests the occupant to set a destination with the destination setting unit 36. The destination setting unit 36 requests the occupant to set a destination via the HMI 7 by using at least one of image display and voice output. In S52, the ECU 30 sets a destination in autonomous driving based on a result that is input to the HMI 7 by the occupant with the destination setting unit 36. Thereafter, the ECU 30 finishes this process.

In S54, the ECU 30 sets a destination in autonomous driving with the destination setting unit 36. The destination setting unit 36 automatically sets a destination in autonomous driving based on the current time, the position of the vehicle on the map, the occupant state, the destination candidate data, and the schedule data. Thereafter, the ECU 30 finishes this process.

Advantageous Effects of Autonomous Driving System According to Second Embodiment According to the above-described autonomous driving system 200 of the second embodiment, schedule data of an occupant having undergone personal authentication is acquired from a portable information terminal of the occupant or an information network, and thus a destination in autonomous driving can be set based on the schedule data of the occupant. Therefore, according to the autonomous driving system 200, since a destination in autonomous driving can be set based on the schedule data of the occupant, the occupant can automatically set a destination to the destination in autonomous driving by registering a scheduled destination in the schedule data, and thus the occupant's convenience regarding setting of a destination can be further improved.

Third Embodiment

Figure 7:
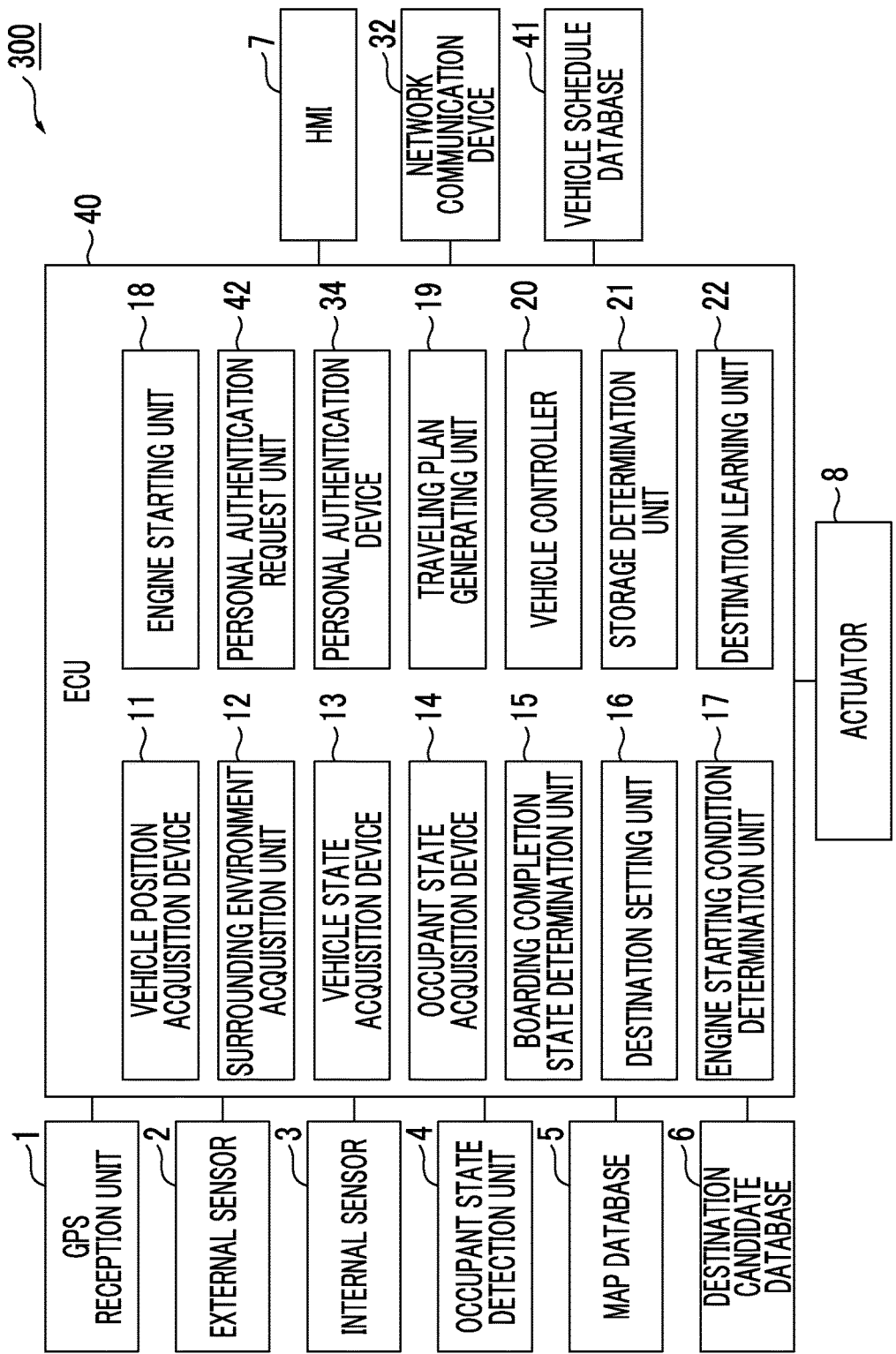
FIG. 7 is a block diagram illustrating an autonomous driving system according to a third embodiment.

Next, a description will be made of an autonomous driving system 300 according to a third embodiment. FIG. 7 is a block diagram illustrating the autonomous driving system 300 according to the third embodiment. The autonomous driving system 300 illustrated in FIG. 7 is different from the autonomous driving system of the first embodiment in that a request for personal authentication is made by using vehicle schedule data. In FIG. 7, constituent elements identical or corresponding to those of the first embodiment are given the same reference numerals, and repeated description will be omitted.

Configuration of Autonomous Driving System According to Third Embodiment

As illustrated in FIG. 7, an ECU 40 of the autonomous driving system 300 is connected to a vehicle schedule database 41. The ECU 40 includes a personal authentication request unit 42. The ECU 40 is connected to the network communication device 32 of the second embodiment and also includes the personal authentication device 34 of the second embodiment.

The vehicle schedule database 41 is a database in which vehicle schedule data is stored. The vehicle schedule data is data regarding a schedule correlated with a vehicle instead of an occupant. In a case where the vehicle is, for example, a company vehicle, vehicle schedule data correlated with a company vehicle of which a use schedule is defined in advance is stored in the vehicle schedule database 41. In a case where the vehicle is a home vehicle, schedule data of an owner of the vehicle may be stored in the vehicle schedule database 41 as vehicle schedule data. The vehicle schedule data includes a use time period of the vehicle and personal authentication information of an occupant (for example, a driver). The vehicle schedule data may include a scheduled destination, and may include an occupant state. The vehicle schedule database 41 may be provided in a server that can perform communication with the vehicle.

The personal authentication request unit 42 gives a request for personal authentication to an occupant (for example, a driver) in a case where an engine of a vehicle that is not scheduled in the vehicle schedule data of the vehicle schedule database 41 is started. The personal authentication request unit 42 gives a request for personal authentication to an occupant via the HMI 7, for example, in a case where an engine of a vehicle is started in a time period that is not scheduled in the vehicle schedule data.

The personal authentication request unit 42 may give a request for personal authentication to an occupant in a case where a destination that is not scheduled in the vehicle schedule data is set, and an engine of a vehicle is started. The personal authentication request unit 42 may give a request for personal authentication to an occupant in a case where an engine of a vehicle is started in an occupant state that is not scheduled in the vehicle schedule data. A request for the personal authentication may be given to a single occupant, and may be given to all occupants. In a case where the destination setting unit 16 determines that a destination in autonomous driving is unable to be automatically set, the personal authentication request unit 42 may give a request for personal authentication to an occupant. The occupant performs personal authentication by using the personal authentication device 34 via the HMI 7 or the like. The personal authentication may be performed through face authentication that reduces a burden on the occupant.

The personal authentication request unit 42 determines whether or not the occupant having undergone the personal authentication is a person scheduled in the vehicle schedule data. The personal authentication request unit 42 performs the determination based on personal authentication information in the personal authentication device 34 and the vehicle schedule data. Whether or not an occupant is registered as a user of a vehicle in advance may be determined instead of a determination of whether or not the occupant is a person scheduled in the vehicle schedule data.

In a case where the personal authentication request unit 42 determines that the occupant having undergone the personal authentication is a person scheduled in the vehicle schedule data, the personal authentication request unit 42 permits starting of the vehicle. In a case where the personal authentication request unit 42 determines that the occupant having undergone the personal authentication is not a person scheduled in the vehicle schedule data, the personal authentication request unit 42 prohibits starting of the vehicle. The personal authentication request unit 42 transmits a control signal to, for example, the actuator 8 so as to prohibit starting of the vehicle. The personal authentication request unit 42 sends a notification to an owner of the vehicle via the network communication device 32. The personal authentication request unit 42 notifies the owner of the vehicle that a person not scheduled tries to start the vehicle. The personal authentication request unit 42 may send a notification to a notification target person set in advance instead of the owner of the vehicle.

Processes in Autonomous Driving System According to Third Embodiment

Personal Authentication Request Process

Figure 8:
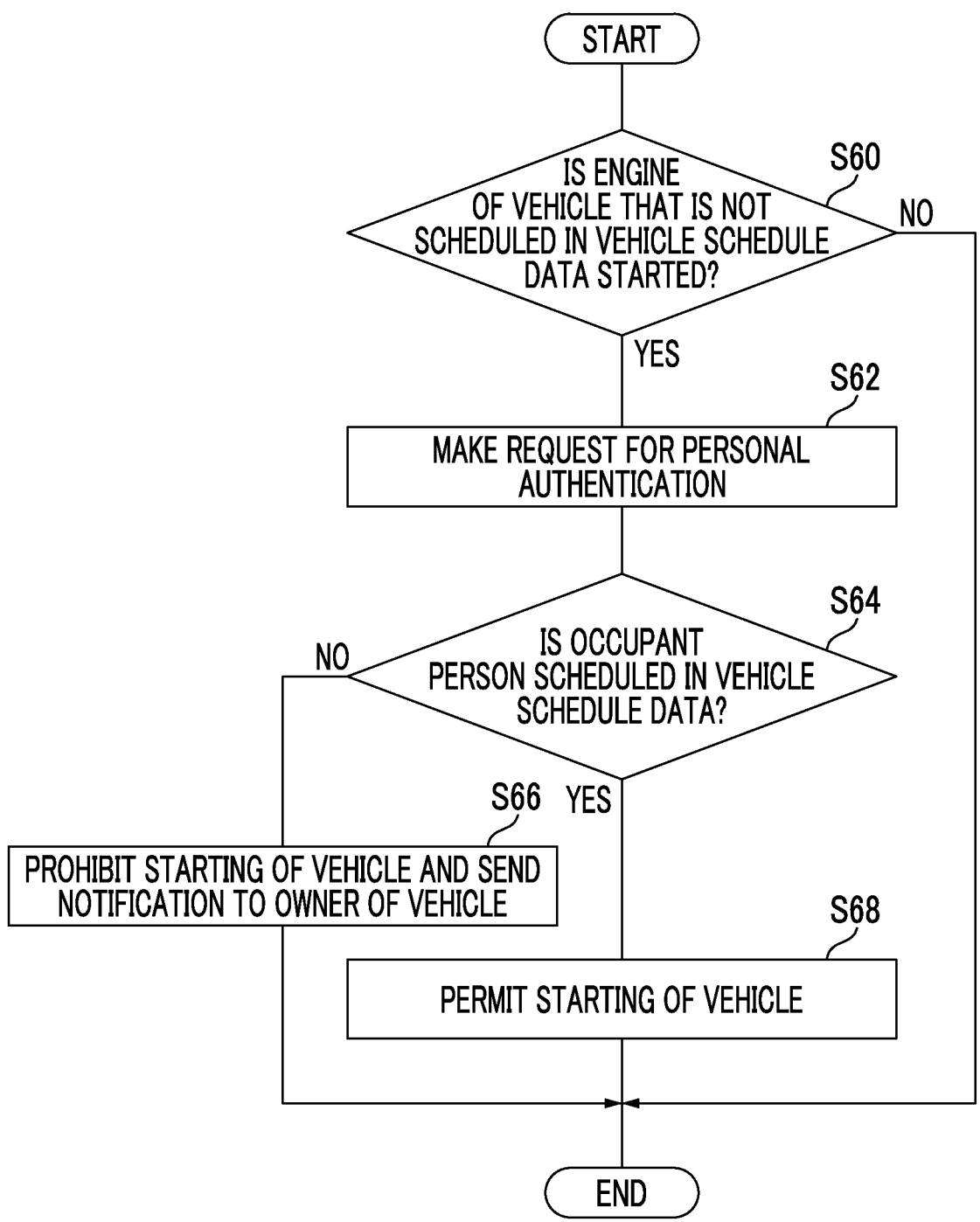
FIG. 8 is a flowchart illustrating a personal authentication request process according to the third embodiment.

Next, a description will be made of a personal authentication request process in the autonomous driving system 300 according to the third embodiment. FIG. 8 is a flowchart illustrating a personal authentication request process according to the third embodiment. The flowchart shown in FIG. 8 is executed when the engine of the vehicle is started. A destination setting process, an engine starting process, and a destination candidate storing process are the same as those in the first embodiment, and thus a description thereof will be omitted.

As illustrated in FIG. 8, in S60, the ECU 40 of the autonomous driving system 300 causes the personal authentication request unit 42 to determine whether or not an engine of a vehicle that is not scheduled in the vehicle schedule data is started. In a case where the personal authentication request unit 42 determines that an engine of a vehicle that is not scheduled in the vehicle schedule data is not started (S60: NO), the ECU 40 finishes this process. In a case where the personal authentication request unit 42 determines that an engine of a vehicle that is not scheduled in the vehicle schedule data is started (S60: YES), the ECU 40 proceeds to S62.

In S62, the ECU 40 causes the personal authentication request unit 42 to give a request for personal authentication to an occupant. The personal authentication request unit 42 gives a request for personal authentication to the occupant via the HMI 7. The occupant performs personal authentication by using the personal authentication device 34 via the HMI 7 or the like.

In S64, the ECU 40 causes the personal authentication request unit 42 to determine whether or not the occupant having undergone the personal authentication is a person scheduled in the vehicle schedule data. In a case where the personal authentication request unit 42 determines that the occupant having undergone the personal authentication is not a person scheduled in the vehicle schedule data (S64: NO), the ECU 40 proceeds to S66. In a case where the personal authentication request unit 42 determines that the occupant having undergone the personal authentication is a person scheduled in the vehicle schedule data (S64: YES), the ECU 40 proceeds to S68.

In S66, the ECU 40 causes the personal authentication request unit 42 to prohibit starting of the vehicle and also to send a notification to an owner of the vehicle. The personal authentication request unit 42 transmits a control signal to, for example, the actuator 8 so as to prohibit starting of the vehicle and also to stop the engine of the vehicle. The personal authentication request unit 42 sends a notification to the owner of the vehicle via the network communication device 32. Thereafter, the ECU 40 finishes this process.

In S68, the ECU 40 causes the personal authentication request unit 42 to permit starting of the vehicle. Thereafter, the ECU 40 finishes this process.

Advantageous Effects of Autonomous Driving System According to Third Embodiment

According to the above-described autonomous driving system 300 of the third embodiment, in a case where an engine of a vehicle that is not scheduled in vehicle schedule data is started, there is a considerably high probability that an improper vehicle may be operated, and thus a contribution to improvement of vehicle security can be further made by making a request for personal authentication.

Fourth Embodiment

Figure 9:
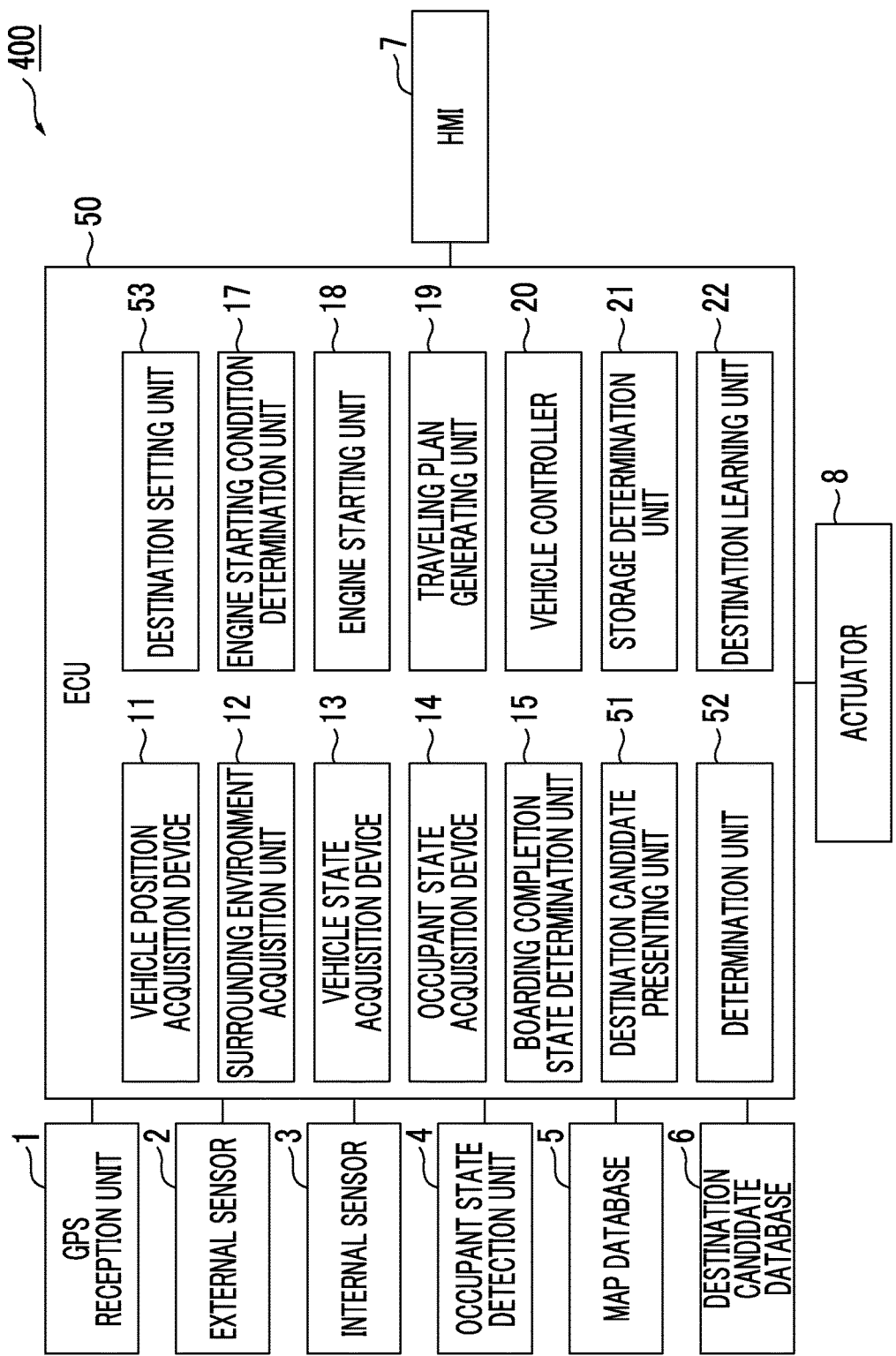
FIG. 9 is a block diagram illustrating an autonomous driving system according to a fourth embodiment.

Next, a description will be made of an autonomous driving system 400 according to a fourth embodiment. FIG. 9 is a block diagram illustrating the autonomous driving system 400 according to the fourth embodiment. The autonomous driving system 400 is different from the autonomous driving system of the first embodiment in that permission for a presented destination candidate is obtained from an occupant instead of automatically setting a destination in autonomous driving. In FIG. 9, constituent elements identical or corresponding to those of the first embodiment and the second embodiment are given the same reference numerals, and repeated description will be omitted.

Configuration of Autonomous Driving System According to Fourth Embodiment

As illustrated in FIG. 9, an ECU 50 of the autonomous driving system 400 according to the fourth embodiment includes a destination candidate presenting unit 51, a determination unit 52, and a destination setting unit 53.

The destination candidate presenting unit 51 presents at least one destination candidate to an occupant of a vehicle in a case where the boarding completion state determination unit 15 determines that the vehicle is in a boarding completion state. The destination candidate presenting unit 51 presents the destination candidate to the occupant by using at least one of image display and voice output via the HMI 7.

The destination candidate presenting unit 51 presents a destination candidate in autonomous driving based on the current time, a position of the vehicle on the map in the vehicle position acquisition device 11, an occupant state in the occupant state acquisition device 14, and destination candidate data in the destination candidate database 6. Specifically, in a case where "home" as a position on the vehicle on the map, a "single male" as an occupant state, and "between 7:00 and 8:00 in the morning on weekdays" as the time are correlated as requirements with "A Company" that is a destination candidate in the destination candidate data, the destination candidate presenting unit 51 presents "A Company" as a destination candidate in autonomous driving when the current time is "between 7:00 and 8:00 in the morning on weekdays", a position of the vehicle on the map is "home", and an occupant state is a "single male".

In a case where a plurality of destination candidates matching requirements of the current time, a position of the vehicle on the map, and an occupant state is present in destination candidate data, the destination candidate presenting unit 51 presents the destination candidates to the occupant. The destination candidate presenting unit 51 may present all destination candidates matching a requirement of at least one of the current time, a position of the vehicle on the map, and an occupant state, to the occupant. A determination of matching with a requirement may be performed in the same manner as in the destination setting unit 16 of the first embodiment.

The determination unit 52 determines whether or not the destination candidate presented by the destination candidate presenting unit 51 is permitted by the occupant. The determination unit 52 determines whether or not the destination candidate is permitted by the occupant based on a result that is input to the HMI 7 by the occupant. A single destination candidate can be conclusively permitted. In a case where the destination candidate is presented by the destination candidate presenting unit 51, and then there is no input from the occupant even after a predetermined time elapses, the determination unit 52 may determine that the destination candidate is not permitted by the occupant.

In a case where the determination unit 52 determines that the destination candidate is permitted by the occupant, the destination setting unit 53 sets the destination candidate permitted by the occupant as a destination in autonomous driving. In a case where the determination unit 52 determines that the destination candidate is not permitted by the occupant, the destination setting unit 53 requests the occupant to set a destination. The destination setting unit 53 requests the occupant to set a destination via the HMI 7. The destination setting unit 53 sets a destination in autonomous driving based on a result that is input to the HMI 7 by the occupant.

Processes in Autonomous Driving System According to Fourth Embodiment

Next, a description will be made of processes in the autonomous driving system 400 according to the fourth embodiment. Herein, a description will be made of a destination candidate presenting process and a destination setting process. An engine starting process and a destination candidate storing process are the same as those in the first embodiment, and thus a description thereof will be omitted.

Destination Candidate Presenting Process

Figure 10B:
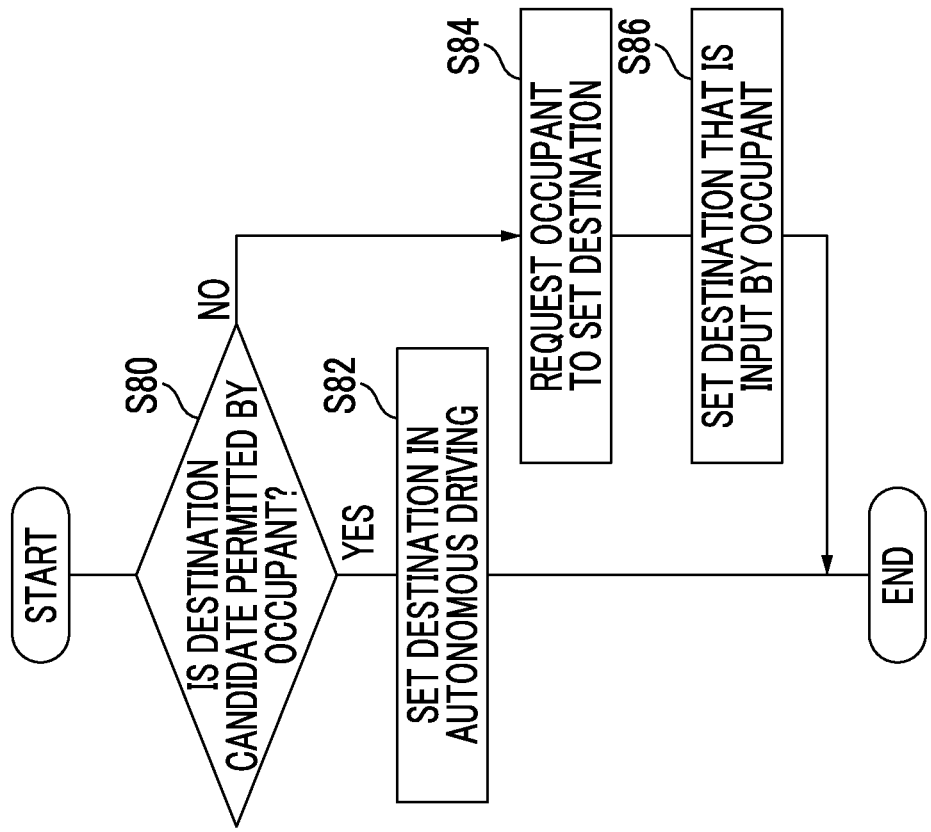
FIG. 10B is a flowchart illustrating a destination setting process according to the fourth embodiment.
Figure 10A:
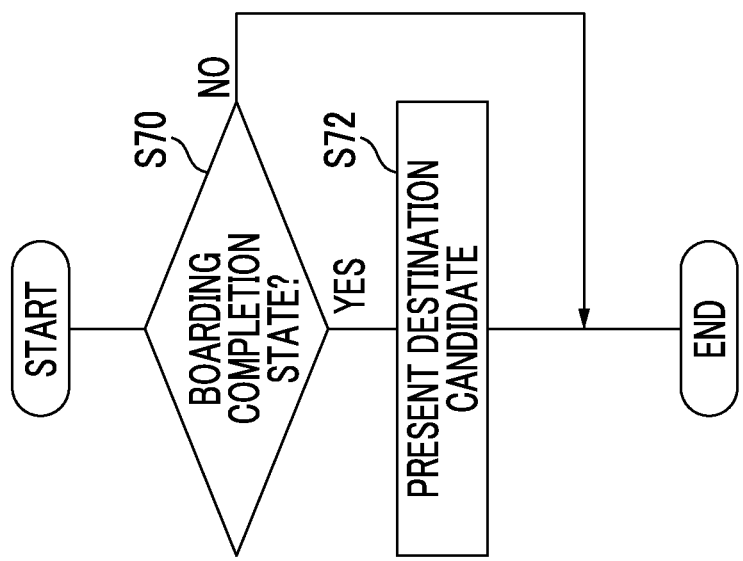
FIG. 10A is a flowchart illustrating a destination candidate presenting process according to the fourth embodiment.

FIG. 10A is a flowchart illustrating a destination candidate presenting process according to the fourth embodiment. The flowchart shown in FIG. 10A is executed when autonomous driving is started.

As illustrated in FIG. 10A, in S70, the ECU 50 of the autonomous driving system 400 causes the boarding completion state determination unit 15 to determine whether or not the vehicle is in a boarding completion state. The boarding completion state determination unit 15 performs the determination based on a vehicle state in the vehicle state acquisition device 13 and an occupant state in the occupant state acquisition device 14. In a case where the boarding completion state determination unit 15 determines that the vehicle is not in a boarding completion state (S70: NO), the ECU 50 finishes this process. Thereafter, the ECU 50 performs the process in S70 again after a predetermined time elapses. In a case where the boarding completion state determination unit 15 determines that the vehicle is in a boarding completion state (S70: YES), the ECU 50 proceeds to S72.

In S72, the ECU 50 causes the destination candidate presenting unit 51 to present at least one destination candidate to an occupant of a vehicle. The destination candidate presenting unit 51 presents a destination candidate in autonomous driving based on the current time, a position of the vehicle on the map, an occupant state, and destination candidate data. Thereafter, the ECU 50 finishes this process, and performs the next destination setting process.

Destination Setting Process

FIG. 10B is a flowchart illustrating a destination setting process according to the fourth embodiment. The flowchart shown in FIG. 10B is executed when S72 in FIG. 10A is executed.

As illustrated in FIG. 10B, in S80, the ECU 50 causes the determination unit 52 to determine whether or not the destination candidate is permitted by the occupant. The determination unit 52 performs the determination based on a result that is input to the HMI 7 by the occupant. In a case where the determination unit 52 determines that the destination candidate is permitted by the occupant (S80: YES), the ECU 50 proceeds to S82. In a case where the determination unit 52 determines that the destination candidate is not permitted by the occupant (S80: NO), the ECU 50 proceeds to S84.

In S82, the ECU 50 causes the destination setting unit 53 to set a destination in autonomous driving. The destination setting unit 53 sets the destination candidate permitted by the occupant as a destination in autonomous driving. Thereafter, the ECU 50 finishes this process.

In S84, the ECU 50 requests the occupant to set a destination with the destination setting unit 53. The destination setting unit 53 requests the occupant to set a destination via the HMI 7. In S86, the ECU 50 sets a destination in autonomous driving based on a result that is input to the HMI 7 by the occupant with the destination setting unit 53. Thereafter, the ECU 50 finishes this process.

Advantageous Effects of Autonomous Driving System According to Fourth Embodiment According to the above-described autonomous driving system 400 of the fourth embodiment, in a case where a vehicle is determined as being in a boarding completion state, at least one destination candidate can be presented to an occupant, and a destination candidate permitted by the occupant can be set as a destination in autonomous driving, based on a position of the vehicle on the map, an occupant state, and destination candidate data. According to the autonomous driving system 400, since a destination candidate based on an occupant state can be presented by taking into consideration a relationship between an occupant state and a destination in autonomous driving of a vehicle, the accuracy of presenting a destination candidate desired by the occupant can be increased, and thus the occupant's convenience regarding setting of a destination can be further improved.

According to the autonomous driving system 400, a destination candidate in autonomous driving can be presented based on commuting hours and school attendance hours by further taking into consideration the current time in automatic setting of a destination.

According to the autonomous driving system 400, since the storage determination unit 21 is provided in the same manner as in the first embodiment, and the storage determination unit 21 stores a destination permitted by an occupant in the destination candidate database 6, an inappropriate destination candidate can be prevented from being included in destination candidate data.

According to the autonomous driving system 400, the engine starting condition determination unit 17 and the engine starting unit 18 are provided in the same manner as in the first embodiment, and in a case where a vehicle is brought into a boarding completion state during stoppage of an engine of the vehicle, and the engine starting condition is determined as being satisfied, the engine of the vehicle is automatically started, and thus the convenience regarding engine starting of an occupant can be considerably improved.

Fifth Embodiment

Figure 11:
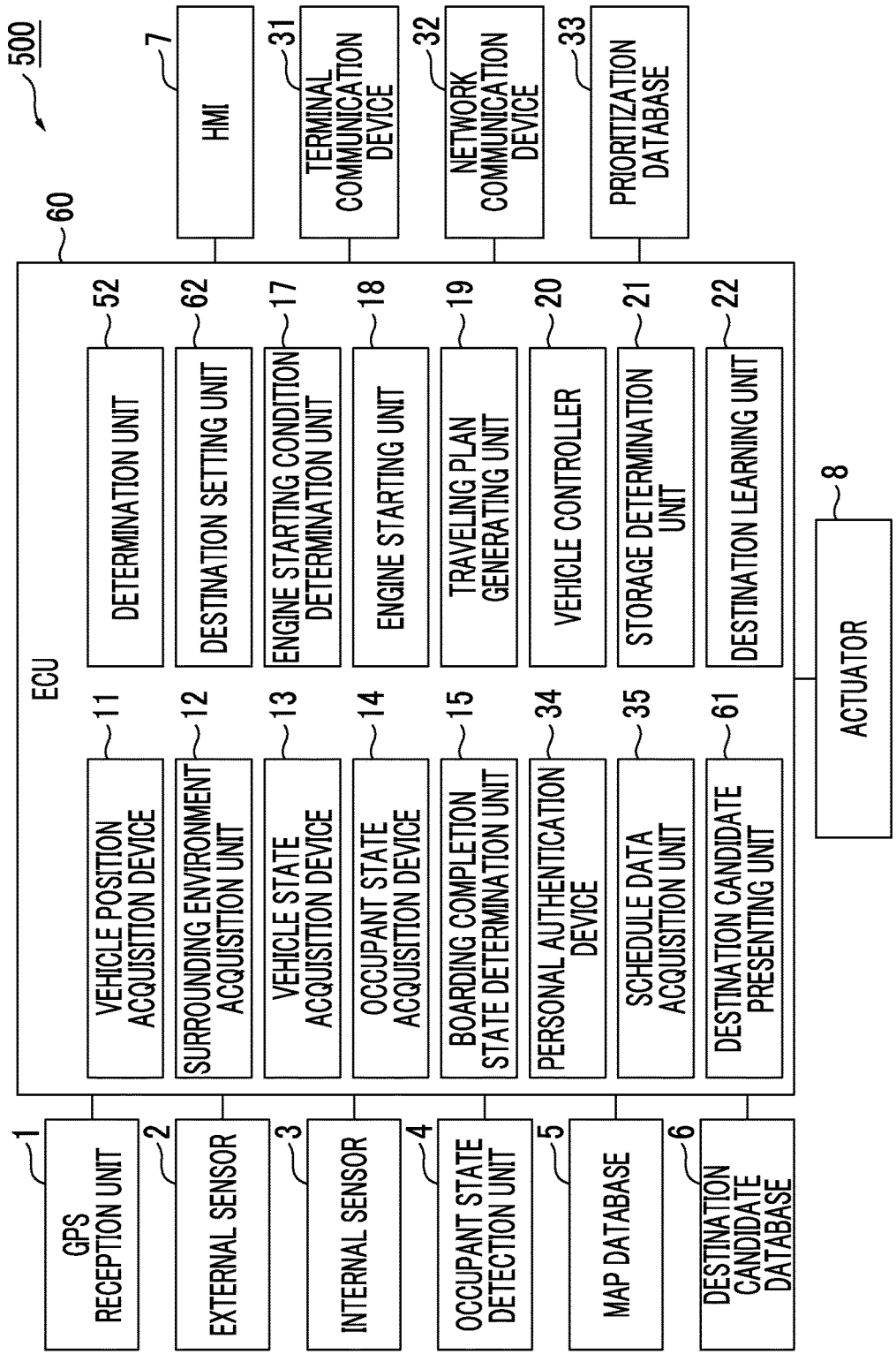
FIG. 11 is a block diagram illustrating an autonomous driving system according to a fifth embodiment.

Next, a description will be made of an autonomous driving system 500 according to a fifth embodiment. FIG. 11 is a block diagram illustrating the autonomous driving system 500 according to the fifth embodiment. The autonomous driving system 500 illustrated in FIG. 11 is different from the autonomous driving system of the fourth embodiment in that at least one of a destination candidate and a scheduled destination in autonomous driving is presented based on schedule data of an occupant. In FIG. 11, constituent elements identical or corresponding to those of the first embodiment, the second embodiment, and the fourth embodiment are given the same reference numerals, and repeated description will be omitted.

Configuration of Autonomous Driving System According to Fifth Embodiment

As illustrated in FIG. 11, an ECU 60 of the autonomous driving system 500 according to the fifth embodiment is connected to the terminal communication device 31, the network communication device 32, and the prioritization database 33 of the second embodiment. The ECU 60 includes the personal authentication device 34 and the schedule data acquisition unit 35.

In a case where the boarding completion state determination unit 15 determines that a vehicle is in a boarding completion state, a destination candidate presenting unit 61 of the ECU 60 presents at least one of a destination candidate and a scheduled destination to an occupant of the vehicle based on the current time, a position of the vehicle on the map, an occupant state, destination candidate data, and schedule data of the occupant acquired by the schedule data acquisition unit 35.

First, a description will be made of a case where items of schedule data of a single occupant are acquired by the schedule data acquisition unit 35. The destination candidate presenting unit 61 acquires a scheduled destination (a scheduled destination correlated with a schedule at one unit time after the current time) to which the vehicle is to be directed next at the current time from the schedule data of the occupant. The destination candidate presenting unit 61 acquires a destination candidate matching a requirement of at least one of the current time, a position of the vehicle on the map, and an occupant state from destination candidate data based on the current time, the position of the vehicle on the map, the occupant state, and the destination candidate data. The destination candidate presenting unit 61 presents the acquired destination candidate and scheduled destination to the occupant.

The destination candidate presenting unit 61 may determine the propriety of schedule data of the occupant. In a case where the destination candidate presenting unit 61 calculates an arrival time at which the vehicle arrives at a scheduled destination on the schedule data of the occupant in an autonomous driving mode, and the arrival time is a time later than a scheduled time correlated with the scheduled destination on the schedule data, the destination candidate presenting unit 61 determines that the schedule data is proper. In a case where an arrival time for the scheduled destination is a time earlier than a scheduled time, the destination candidate presenting unit 61 determines that the schedule data is not proper.

In a case where the destination candidate presenting unit 61 determines that the schedule data is not proper, the destination candidate presenting unit 61 does not present a scheduled destination in the schedule data that is not proper to the occupant.

Next, a description will be made of a case where schedule data of a plurality of occupants is acquired by the schedule data acquisition unit 35. In a case where items of schedule data of a plurality of occupants are acquired by the schedule data acquisition unit 35, the destination candidate presenting unit 61 presents at least one of a destination candidate and a scheduled destination to the occupant based on prioritization data in the prioritization database 33 in addition to the current time, a position of the vehicle on the map, an occupant state, destination candidate data, and the schedule data of the occupants.

The destination candidate presenting unit 61 acquires respective scheduled destinations to which the vehicle is to be directed next at the current time from the items of schedule data of the occupants. The destination candidate presenting unit 61 applies the priority to the acquired scheduled destinations based on prioritization data.

In a case where the scheduled destinations match each other, the destination candidate presenting unit 61 heightens the priority of the matching scheduled destinations compared with a case where the scheduled destinations do not match each other. The destination candidate presenting unit 61 may calculate an arrival time of the vehicle in an autonomous driving mode for each scheduled destination, and may apply the priority to the scheduled destination based on a relationship between a scheduled time for the scheduled destination and the arrival time. In this case, the destination candidate presenting unit 61 lowers the priority of a scheduled destination for which an arrival time is a predetermined time or more before a scheduled time or a predetermined time or more after the scheduled time compared with a scheduled destination for which an arrival time is around a scheduled time (within a predetermined time from the scheduled time).

The destination candidate presenting unit 61 presents a scheduled destination of which the priority is equal to or more than a priority threshold value, and the acquired destination candidate, to the occupant. The priority threshold value is a preset threshold value. The destination candidate presenting unit 61 may present all scheduled destinations to the occupant without applying the priority to the scheduled destinations.

Figure 12:
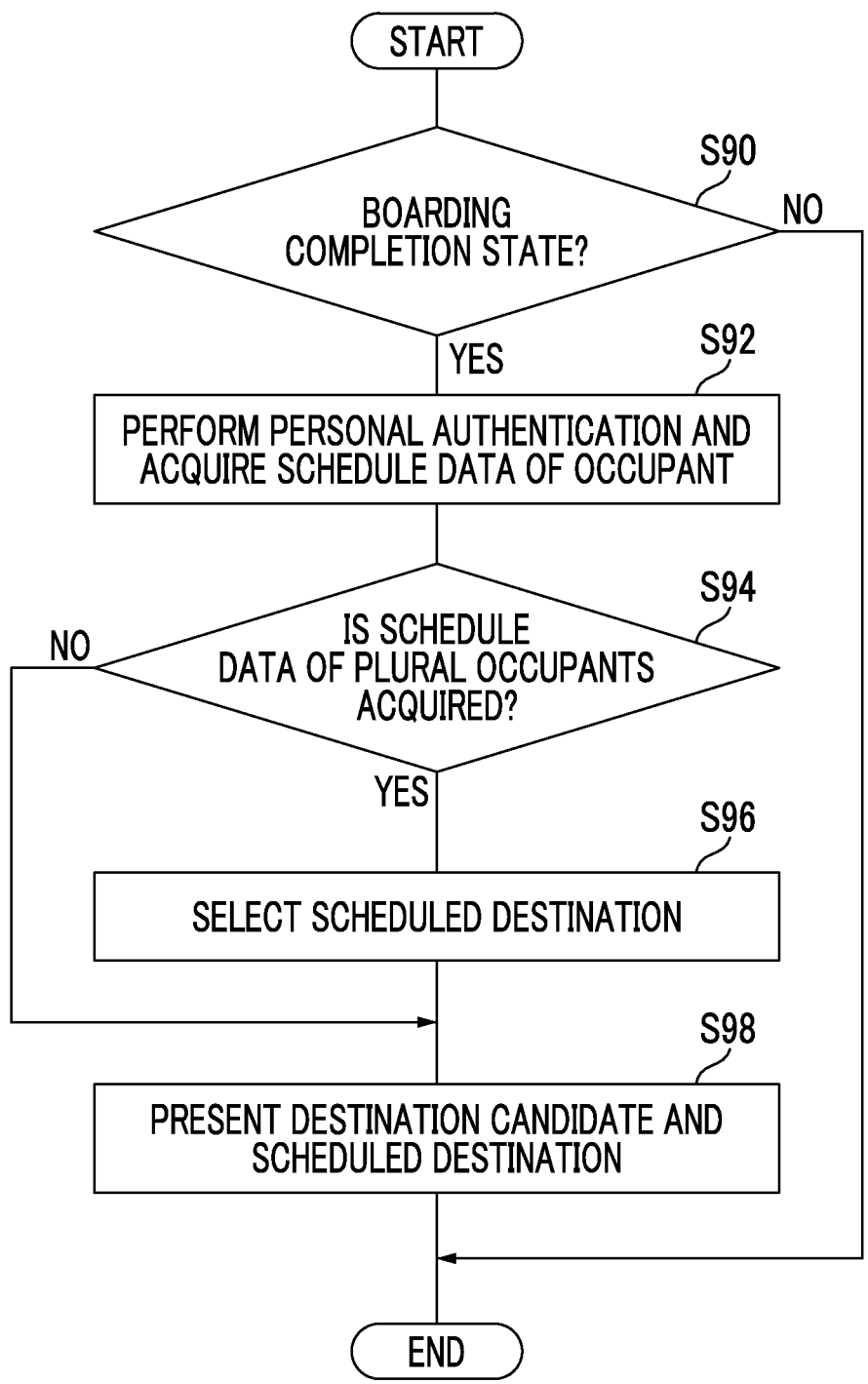
FIG. 12 is a flowchart illustrating a destination candidate presenting process according to the fifth embodiment.

Processes in Autonomous Driving System According to Fifth Embodiment Destination Candidate Presenting Process Next, a description will be made of a destination candidate presenting process in the autonomous driving system 500 according to the fifth embodiment. FIG. 12 is a flowchart illustrating a destination candidate presenting process according to the fifth embodiment. The flowchart shown in FIG. 12 is executed when autonomous driving is started. An engine starting process, a destination candidate storing process, and a destination setting process are the same as those in the fourth embodiment, and thus a description thereof will be omitted.

As illustrated in FIG. 12, in S90, the ECU 60 of the autonomous driving system 500 causes the boarding completion state determination unit 15 to determine whether or not the vehicle is in a boarding completion state. The boarding completion state determination unit 15 performs the determination based on a vehicle state in the vehicle state acquisition device 13 and an occupant state in the occupant state acquisition device 14. In a case where the boarding completion state determination unit 15 determines that the vehicle is not in a boarding completion state (S90: NO), the ECU 60 finishes this process. Thereafter, the ECU 60 performs the process in S90 again after a predetermined time elapses. In a case where the boarding completion state determination unit 15 determines that the vehicle is in a boarding completion state (S90: YES), the ECU 60 proceeds to S92.

In S92, the ECU 60 causes the personal authentication device 34 to perform personal authentication of the occupant and the schedule data acquisition unit 35 to acquire schedule data of the occupant. The schedule data acquisition unit 35 acquires the schedule data of the occupant from the portable information terminal carried by the occupant via the terminal communication device 31. The schedule data acquisition unit 35 acquires the schedule data of the occupant having undergone the personal authentication using the personal authentication device 34, from the server on the wireless network via the network communication device 32.

In S94, the ECU 60 causes the destination candidate presenting unit 61 to determine whether or not items of schedule data of a plurality of occupants are acquired. In a case where the destination candidate presenting unit 61 determines that the items of schedule data of the occupants are acquired (S94: YES), the ECU 60 proceeds to S96. In a case where the destination candidate presenting unit 61 determines that the items of schedule data of the occupants are not acquired (S94: NO), the ECU 60 proceeds to S98.

In S96, the ECU 60 causes the destination candidate presenting unit 61 to select a scheduled destination. The destination candidate presenting unit 61 applies the priority to a plurality of scheduled destinations on the times of schedule data of the occupants based on prioritization data, and selects a scheduled destination of which the priority is equal to or more than a predetermined priority threshold value.

In S98, the ECU 60 causes the destination candidate presenting unit 61 to present the destination candidate and the scheduled destination to the occupant. The destination candidate presenting unit 61 presents at least one of the destination candidate and the scheduled destination to the occupant via the HMI 7. Thereafter, the ECU 60 finishes this process.

Advantageous Effects of Autonomous Driving System According to Fifth Embodiment

According to the above-described autonomous driving system 500 of the fifth embodiment, schedule data of an occupant is acquired from a portable information terminal of the occupant or an information network, and thus a destination in autonomous driving can be set based on the schedule data of the occupant. Therefore, according to the autonomous driving system 500, a destination candidate and a scheduled destination in autonomous driving can be presented based on the schedule data of the occupant, and can thus be presented at the time of setting a destination by the occupant registering the scheduled destination in the schedule data, so that the occupant's convenience regarding setting of a destination can be further improved.

According to the autonomous driving system 500, in a case where items of schedule data of a plurality of occupants are acquired, scheduled destinations on the items of schedule data of the occupants can be appropriately prioritized, and a destination candidate in autonomous driving can be presented, based on the current time, a position of the vehicle on the map, an occupant state, destination candidate data, and prioritization data set in advance.

The embodiments of the present disclosure have been described, but an applicable embodiment of the present disclosure is not limited to the embodiments above. A gist of the present disclosure may be realized in various forms to which various modifications and alterations are applied based on not only the above-described embodiments but also the knowledge of a person skilled in the art.

In the autonomous driving system according to the first to fifth embodiments, starting of autonomous driving is not limited to an operation of an occupant starting autonomous driving. In the autonomous driving system, in a case where the occupant permits starting of autonomous driving in advance, the autonomous driving of a vehicle may be automatically started when a predetermined autonomous driving starting condition is satisfied.

The autonomous driving system 100 according to the first embodiment may set a destination in autonomous driving without taking into consideration the current time. In other words, the destination setting unit 16 may set a destination in autonomous driving based on a position of the vehicle on the map, an occupant state, and destination candidate data. The destination setting unit 16 may set a destination in autonomous driving based on a position of the vehicle on the map and an occupant state (for example, the presence or absence of boarding of a care receiver) in a vehicle such as a vehicle for care of which an application is restricted. In this case, a destination candidate is not needed to be correlated with a time in the destination candidate database 6. The autonomous driving system 400 according to the fourth embodiment may also present a destination candidate to an occupant without taking into consideration the current time. The destination candidate presenting unit 51 may present a destination candidate based on a position of the vehicle on the map, an occupant state, and destination candidate data.

The autonomous driving system 100 according to the first embodiment may not include the engine starting condition determination unit 17 and the engine starting unit 18. The autonomous driving system 100 is not needed to automatically start an engine of a vehicle. This is also the same for the autonomous driving system 400 according to the fourth embodiment.

The autonomous driving system 100 according to the first embodiment may not include the storage determination unit 21 and the destination learning unit 22. The autonomous driving system 100 may perform correction, addition, and the like of destination candidate data solely in a case where an occupant performs manual setting without automatic learning about the destination candidate data. This is also the same for the autonomous driving system 400 according to the fourth embodiment.

The autonomous driving system 400 according to the fourth embodiment may include the network communication device 32 and the personal authentication device 34 of the second embodiment, and the vehicle schedule database 41 and the personal authentication request unit 42 of the third embodiment. In other words, in the autonomous driving system 400 according to the fourth embodiment, in a case where there is engine starting that is not scheduled on vehicle schedule data, a request for personal authentication may be given to an occupant.

The autonomous driving system 200 according to the second embodiment may not include both of the terminal communication device 31, and the network communication device 32 and the personal authentication device 34. The schedule data acquisition unit 35 may acquire schedule data of an occupant from either one of a portable information terminal and an information network. This is also the same for the autonomous driving system 500 according to the fifth embodiment.

The autonomous driving system 200 according to the second embodiment may not determine whether or not items of schedule data of a plurality of occupants are acquired. The autonomous driving system 200 according to the second embodiment may normally use solely schedule data of a driver. This is also the same for the autonomous driving system 500 according to the fifth embodiment.

In the destination candidate database 6, a destination candidate may not be correlated with a position of a vehicle on a map. In this case, the destination setting unit 16, 36 acquires a relationship between a position of the vehicle on the map (the current position of the vehicle on the map) and a position where a destination candidate is located. In other words, for example, in a case where a distance is too long (a destination candidate is far away by a predetermined distance or more such as 100 km), or the current position of the vehicle on the map is a position where the destination candidate is located, the destination setting unit 16, 36 does not set the destination candidate as a destination in autonomous driving. Similarly, in a case where a distance is too long, or the current position of the vehicle on the map is a position where the destination candidate is located, the destination candidate presenting unit 51, 61 does not present the destination candidate to an occupant.

The boarding completion state determination unit 15 may determine whether or not a vehicle is a boarding completion state in a case where a door is opened and closed instead of starting of autonomous driving. A destination in autonomous driving may be set in advance in the destination setting unit according to the first to third embodiments before autonomous driving is started. An occupant state may not include a sitting position of an occupant.

The boarding completion state determination unit 15 may determine whether or not a vehicle is a boarding completion state regardless of starting of autonomous driving. The boarding completion state determination unit 15 may determine whether or not a vehicle is in a boarding completion state, for example, in a case where opening and closing of a door of the vehicle is detected while the vehicle is stopping or parking.

The occupant state acquisition device 14 may acquire a sitting position of an occupant by acquiring position information of a portable information terminal of the occupant via the terminal communication device 31. The boarding completion state determination unit 15 may determine that a vehicle is in a boarding completion state based on a surrounding environment of the vehicle and a vehicle state in a case where an external object of the vehicle is not detected, and a door is opened and closed. The boarding completion state determination unit 15 may determine that a vehicle is in a boarding completion state in a case where a door of the vehicle is opened and closed, and then a weight is detected in a seat of the vehicle.

The destination setting unit 16 may not determine whether or not a destination can be automatically set. In a case where none of the requirements correlated with destination candidates included in destination candidate data match requirements of the current time, a position of the vehicle on the map, and an occupant state when the requirements are compared with each other, the destination setting unit 16 may automatically set home as a destination in autonomous driving. The destination setting unit 36 may not also determine whether or not a destination can be automatically set. The destination setting unit 36 may automatically set home as a destination in autonomous driving in a case where an appropriate destination candidate is not included in destination candidate data, and schedule data of an occupant is unable to be acquired, as described above, (or in a case where schedules after the current time are not included in schedule data). The destination setting unit 16, 36 may set a destination in autonomous driving based on vehicle schedule data.

The destination setting unit 16 may take into consideration an arrival frequency at which a vehicle arrives at a destination in an autonomous driving mode when a destination candidate is set as the destination in autonomous driving. The destination setting unit 16 sets the destination in autonomous driving based on the current time, a position of the vehicle on a map, an occupant state, the arrival frequency, and destination candidate data. In this case, the arrival frequency is stored in the destination candidate database 6 in correlation with the destination candidate.

In a case where a destination in autonomous driving is set, the destination setting unit 16 may set a destination of a return route. In a case where a destination in autonomous driving is a "supermarket", and an occupant state is a "single female", the destination setting unit 16 may set "home" corresponding to a destination candidate of a return route as a destination in autonomous driving. In a case where a destination candidate without a return route is set as a destination in autonomous driving, the destination setting unit 16 may automatically set a return route. The destination candidate without a return route is, for example, a sleeping facility such as home, a villa, or a hotel. In a case where home is located within a predetermined distance even in a destination candidate without a return route, the destination setting unit 16 may set home as a destination of the return route.

The vehicle state acquisition device 13 may acquire and open/closed states of a bonnet and an oil filler port of a vehicle as a vehicle state. The vehicle state acquisition device 13 may acquire a fuel amount (a gasoline amount, a hydrogen amount, or an electrical amount) of a vehicle as a vehicle state. The engine starting condition determination unit 17 may include a closed state of a bonnet and an oil filler port of a vehicle in the engine starting condition. The engine starting condition determination unit 17 may include a state in which a fuel amount of a vehicle is equal to or more than a predetermined threshold value, in the engine starting condition.

The engine starting condition determination unit 17 may determine whether or not the engine starting condition is satisfied based on a vehicle state and a surrounding environment of the vehicle. The engine starting condition determination unit 17 may include a state in which there is no object near a muffler of a vehicle in the engine starting condition. The engine starting condition determination unit 17 may include a state in which there is no object within a predetermined distance from a vehicle in the engine starting condition. The engine starting condition determination unit 17 may include a state in which a destination in autonomous driving is set and a route to the destination is calculated, in the engine starting condition.

The engine starting condition determination unit 17 may include a state in which alcohol is determined as not being detected in alcohol checking in the engine starting condition. The engine starting condition determination unit 17 may include a state in which an ETC card having a validity term is appropriately inserted into an on-vehicle apparatus when there is an electronic toll collection system (ETC) on a route to a destination.

The vehicle controller 20 may automate a shift change, a wiper, a headlight, and a hazard lamp of a vehicle. The vehicle controller 20 may automatically perform a shift change in the case where a predetermined condition such as the time of starting of the vehicle is satisfied. The vehicle controller 20 may automatically bring the wiper and the headlight into an AUTO state when autonomous driving is started even in a case where the wiper and the headlight are in a power-off state. The vehicle controller 20 may automatically unlight the hazard lamp when the vehicle is started in an autonomous driving mode from stopping at an edge of a road.

Each database may be configured in a removable medium that is detachable from a vehicle, and may be configured on a cloud.

What is claimed is:

1. An autonomous driving system that performs autonomous driving of a vehicle, the autonomous driving system comprising:
a destination candidate database configured to store destination candidate data including a destination candidate, an occupant state correlated with the destination candidate, and a time correlated with the destination candidate;
a terminal communication device configured to perform communication with a portable information terminal of an occupant of the vehicle; and
an electronic control unit (ECU) programmed to:
acquire a position of the vehicle on a map;
acquire a vehicle state of the vehicle;
acquire the occupant state;
determine whether or not the vehicle is in a boarding completion state based on the vehicle state and the occupant state;
acquire schedule data of the occupant from the portable information terminal through communication using the terminal communication device;
based on a current time, the position of the vehicle on the map, the occupant state, and the destination candidate data, acquire the destination candidate matching a requirement of at least one of the current time, the position of the vehicle on the map, and the occupant state, the requirements being correlated with the destination candidate in the destination candidate data;
based on the current time and the schedule data, acquire a scheduled destination to which the vehicle is to be directed next at the current time from the schedule data of the occupant;
set a destination of the vehicle in autonomous driving based on the current time, the position of the vehicle on the map, the occupant state, the destination candidate data, and the schedule data in a case where the vehicle is in the boarding completion state; and
in a case where the destination candidate matches the scheduled destination, set the destination candidate as the destination, wherein
the electronic control unit is further programmed to:
acquire each scheduled destination to which the vehicle is to be directed next at the current time from a plurality of schedule data of a plurality of occupants when the plurality of the schedule data of the plurality of occupants are acquired;
in a case where the acquired scheduled destinations match each other, set the destination candidate matching the scheduled destinations as the destination;
in a case where none of the acquired scheduled destinations match each other, based on prioritization data in which a distinction among sitting positions of the occupants and the priority is correlated and the sitting positions of the occupants acquired from position information of the portable information terminals acquired by performing communication with the terminal communication device, select a scheduled destination of an occupant whose sitting position is correlated with the highest priority among the acquired scheduled destinations; and
set the destination candidate as the destination when the selected scheduled destination matches the destination candidate.

2. The autonomous driving system according to claim 1, wherein, in a case where the schedule data of a plurality of the occupants is acquired, the electronic control unit sets the destination of the vehicle in autonomous driving based on the current time, the position of the vehicle on the map, the occupant state, the destination candidate data, and prioritization data set in advance.

3. The autonomous driving system according to claim 1, wherein:
the electronic control unit is configured to determine whether or not the occupant permits the destination to be stored in the destination candidate database;
in a case where the electronic control unit determines that the occupant permits the destination to be stored in the destination candidate database, the electronic control unit is configured to store the destination in the destination candidate database as the destination candidate in correlation with the occupant state; and
in a case where the electronic control unit determines that the occupant does not permit the destination to be stored in the destination candidate database, the electronic control unit does not store the destination in the destination candidate database.

4. The autonomous driving system according to claim 1, further comprising a vehicle schedule database configured to store vehicle schedule data correlated with the vehicle,
wherein the electronic control unit is configured to give a request for personal authentication to the occupant in a case where an engine of the vehicle that is not scheduled in the vehicle schedule data is started.

5. The autonomous driving system according to claim 1, wherein:
in a case where the electronic control unit determines that the vehicle is in the boarding completion state during stopping of an engine of the vehicle, the electronic control unit is configured to determine whether or not a preset engine starting condition is satisfied based on the vehicle state; and
in a case where the electronic control unit determines that the engine starting condition is satisfied, the electronic control unit is configured to start the engine of the vehicle.

6. An autonomous driving system that performs autonomous driving of a vehicle, the autonomous driving system comprising:
a destination candidate database configured to store destination candidate data including a destination candidate, an occupant state correlated with the destination candidate, and a time correlated with the destination candidate;
a network communication device configured to perform communication with an information network;
a personal authentication device configured to perform personal authentication of an occupant of the vehicle; and
an electronic control unit programmed to:
acquire a position of the vehicle on a map;
acquire a vehicle state of the vehicle;
acquire the occupant state, wherein the occupant state includes the number of occupants and a sitting position of the occupant;

determine whether or not the vehicle is in a boarding completion state based on the vehicle state and the occupant state;
acquire, based on a current time, the position of the vehicle on the map, the occupant state, and the destination candidate data, the destination candidate matching a requirement of at least one of the current time, the position of the vehicle on the map, and the occupant state, the requirements being correlated with the destination candidate in the destination candidate data;
acquire schedule data of the occupant having undergone the personal authentication by the personal authentication device through communication using the network communication device;
based on the current time and the schedule data, acquire a scheduled destination to which the vehicle into be directed next at the current time from the schedule data of the occupant;
in a case where the vehicle is in, the boarding completion state, set a destination of the vehicle in autonomous driving based on the current time, the position of the vehicle on the map, the occupant state, the destination candidate data, and the schedule data; and
in a case where the destination candidate matches the scheduled destination, set the destination candidate as the destination, wherein
the electronic control unit is further programmed to:
acquire personal information of an occupant of each seat as the occupant state based on a captured image of an in-vehicle camera;
acquire each scheduled destination to which the vehicle is to be directed next at the current time from a plurality of schedule data of a plurality of occupants when the plurality of the schedule data of the plurality of occupants are acquired;
in a case where the acquired scheduled destinations match each other, set the destination candidate matching the scheduled destinations as the destination;
in a case where none of the acquired scheduled destinations match each other, based on prioritization data in which a distinction among sitting positions of the occupants and the priority is correlated and the sitting positions of the occupants acquired from the occupant state and the personal information, select a scheduled destination of an occupant whose sitting position is correlated with the highest priority among the acquired scheduled destinations; and
set the destination candidate as the destination when the selected scheduled destination matches the destination candidate.

7. An autonomous driving system that performs autonomous driving of a vehicle, the autonomous driving system comprising:
a destination candidate database configured to store destination, candidate data including a destination candidate, an occupant state correlated with the destination candidate, and a time correlated with the destination candidate;
an electronic control unit programmed to:
acquire a position of the vehicle on a map;
acquire a vehicle state of the vehicle;
acquire the occupant state, wherein the occupant state includes the number of occupants and a sitting position of an occupant;
determine whether or not the vehicle is in a boarding completion state based on the vehicle state and the occupant state,
acquire, based on a current time, the position of the vehicle on the map, the occupant state, and the destination candidate data, the destination candidate matching a requirement of at least one of the current time, the position of the vehicle on the map, the occupant state, the requirements being correlated with the destination candidate in the destination candidate data;
acquire, based on the current time and the schedule data, a scheduled destination to which the vehicle is to be directed next at the current time from the schedule data of the occupant; and
set a destination of the vehicle in autonomous driving based on the position of the vehicle on the map, the occupant state, and the destination candidate data when the vehicle is in the boarding completion state;
a presentation device configured to present information to the occupant, and
an input device configured to receive a permission operation of the occupant, wherein
the electronic control unit is further programmed to
cause the presentation device to present at least one of the destination candidates to the occupant based on the position of the vehicle on the map, the occupant state, and the destination candidate data, when the electronic control unit determines that the vehicle is in the boarding completion state;
determine whether or not the destination candidate is permitted by the occupant based on an input from the input device; and
set the destination candidate as the destination of the vehicle in autonomous driving in a case where the destination candidate is permitted by the occupant,
further comprising:
a network communication device configured to perform communication with an information network; and
a personal authentication device configured to perform personal authentication of the occupant of the vehicle, wherein:
the electronic control unit is further programmed to:
acquire schedule data of the occupant having undergone the personal authentication by the personal authentication device through communication using the network communication device, wherein the schedule data includes a scheduled destination correlated with a scheduled time; and
present the destination candidate and the scheduled destination to the occupant; and
based on the received permission operation of the occupant, set one of the destination candidate and the scheduled destination as the destination in autonomous driving, wherein
the electronic control unit is further programmed to:
acquire personal information of an occupant of each seat as the occupant state based on a captured image of an in-vehicle camera;
acquire each scheduled destination to which the vehicle is to be directed next at the current time from a plurality of schedule data of a plurality of occupants when the plurality of the schedule data of the plurality of occupants are acquired;
based on prioritization data in which a distinction among sitting positions of the occupants and the priority is correlated and the sitting positions of the occupants acquired from the occupant state and the personal information, apply the priority to the plurality of scheduled destinations; and present a scheduled destination of which the priority is equal to or more than a priority threshold value and the destination candidate to the occupant.

8. The autonomous driving system according to claim 7, wherein, in a case where the plurality of schedule data of the plurality of the occupants is acquired, the electronic control unit is configured to present at least one of the destination candidate and the scheduled destination to the occupant based on the current time, the position of the vehicle on the map, the occupant state, the destination candidate data, and prioritization data set in advance.

* * * * *